(12) United States Patent
Okamoto et al.

(10) Patent No.: US 7,695,026 B2
(45) Date of Patent: *Apr. 13, 2010

(54) TUBE DEVICE, AND PIPING SYSTEM INCLUDING THE TUBE DEVICE

(75) Inventors: Yutaka Okamoto, Sanda (JP); Tatsuya Fujii, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/938,804

(22) Filed: Nov. 13, 2007

(65) Prior Publication Data

US 2008/0136177 A1    Jun. 12, 2008

Related U.S. Application Data

(62) Division of application No. 10/844,881, filed on May 13, 2004, now Pat. No. 7,314,239.

(30) Foreign Application Priority Data

May 16, 2003    (JP)    .............................. 2003-139140
May 16, 2003    (JP)    .............................. 2003-139166
May 16, 2003    (JP)    .............................. 2003-139222

(51) Int. Cl.
*F16L 25/00*    (2006.01)

(52) U.S. Cl. ..................... 285/331; 285/332; 285/332.1

(58) Field of Classification Search ................. 285/179, 285/246–247, 322, 331, 332, 332.1
See application file for complete search history.

(56) References Cited

U.S. PATENT DOCUMENTS

| | | |
|---|---|---|
| 432,248 A | 7/1890 | Rinman |
| 1,974,402 A | 9/1934 | Templeton |
| 2,410,912 A | 11/1946 | Wenk |
| 2,545,789 A | 3/1951 | Miller |
| 2,549,687 A | 4/1951 | Jack et al. |
| 2,762,611 A | 6/1956 | Monroe et al. |
| 4,116,837 A | 9/1978 | Biermacher |
| 4,508,374 A | 4/1985 | Kantor |
| 4,654,141 A | 3/1987 | Frentzel |

(Continued)

FOREIGN PATENT DOCUMENTS

EP    0959317 A1    11/1999

(Continued)

*Primary Examiner*—Aaron M Dunwoody
*Assistant Examiner*—Fannie Kee
(74) *Attorney, Agent, or Firm*—Panitch Schwarze Belisario & Nadel LLP

(57) ABSTRACT

A tube includes a casing made of a fluororesin. The casing surrounds a fluid tube and lid members, each made of a fluororesin and include a receiving portion for receiving one end portion of the tube. At least one sealing face is disposed in the receiving portion. Union nuts, made of a fluororesin, are fitted onto the end portion of the tube and screwed to one end portion of one of the lid members. A sealing portion is formed by fastening the union nuts to the end portions of the lid members to press the tube from the outside of the tube. A device element such as a filter member is placed in the casing.

5 Claims, 20 Drawing Sheets

U.S. PATENT DOCUMENTS

| | | |
|---|---|---|
| 5,388,871 A | 2/1995 | Saitoh |
| 5,743,572 A | 4/1998 | Nishio |
| 6,045,164 A | 4/2000 | Nishio |
| 6,089,621 A | 7/2000 | Nishio |
| 6,129,098 A | 10/2000 | Miki et al. |
| 6,269,871 B1 | 8/2001 | Nishio et al. |
| 6,513,839 B2 | 2/2003 | Nishio |
| 6,517,123 B2 | 2/2003 | Nishio |
| 6,776,440 B2 * | 8/2004 | Nishio ........................ 285/331 |
| 2002/0180211 A1 | 12/2002 | Nishio |

FOREIGN PATENT DOCUMENTS

| | | |
|---|---|---|
| EP | 1 262 702 A1 | 12/2002 |
| JP | 10-160362 A | 6/1998 |
| JP | 11-070328 A | 3/1999 |
| JP | 2000-265945 A | 9/2000 |
| WO | 99/62613 A1 | 12/1999 |

\* cited by examiner

TUBE DEVICE, AND PIPING SYSTEM INCLUDING THE TUBE DEVICE

CROSS-REFERENCE TO RELATED APPLICATIONS

The present application is a divisional of U.S. patent application Ser. No. 10/844,881, filed May 13, 2004, the disclosure of which is incorporated herein by reference.

BACKGROUND OF THE INVENTION

The present invention relates to a tube device which is useful in an apparatus for producing semiconductor devices, liquid crystal display devices, or chemicals, a production line for foods, or the like, and also to a piping system including such a tube device.

In a piping system in an apparatus for producing semiconductor devices, liquid crystal display devices, or chemicals, a production line for foods, or the like, higher integrity is required in accordance with the purpose of the piping system. In a piping system for an apparatus for producing semiconductor devices, for example, the number of cleaning steps in various cleaning apparatuses which provide one solution for a semiconductor wet process goes on increasing as the integration of a semiconductor device is advanced. Therefore, cleanness of a cleaning process is requested to attain higher integrity. Consequently, severer requirements are imposed on the technique for cleanly supplying cleaning liquid containing ultra pure water or chemical to a cleaning apparatus. In the current state of the art, chemical is contaminated in processes of mixing, diluting, and transporting in a chemical supplying system. However, the wafer cleanliness must cope with the sub quarter micron age. As a chemical supplying system, known is a system of the mass preparation type. In the system, chemical is pumped from a receiving tank to a diluting and mixing tank to be adjusted to a desired composition or concentration, further pumped from a supplying tank through a long-distance pipe to a storage tank in a wet station, and then supplied via a pump and a filter to a cleaning tank (for example, see Japanese Patent Application Laying-Open Nos. 2000265945 and 1170328).

An example of various tube devices which can be applied to a piping system of such an apparatus for producing semiconductor devices is a heat exchanger shown in FIGS. 19 and 20. The heat exchanger is configured so that a sufficient sealing property is ensured in a casing 71 through which heat exchange pipes 70 are passed, thereby enabling the casing to withstand an internal pressure of an adequate level. The heat exchanger is structured in the following manner (for example, see Japanese Patent Application Laying-Open No. 10160362). The body of the casing 71 is formed by a cylindrical shell 72. A plurality of metal fastening members 73 such as tie rods or through bolts are placed parallel to one another on the outer periphery of the shell 72 so as to elongate in the longitudinal direction of the shell. Then both end portions of each of the metal fastening members 73 are passed through lid members 74 which are placed on the end portions of the shell 72, respectively. Nuts 75 are fastened to external thread portions of the ends of the metal fastening members 73 which project from the lid members 74, so that the interfaces between the ends of the shell 72 and butting faces of the lid members 74 are closely sealed. As a result, the casing 71 is hermetically sealed. Furthermore, O-rings 76 serving as sealing members are interposed between the ends of the shell 72 and the butting faces of the lid members 74 (see Japanese Patent Application Laying-Open No. 10160362).

In such a chemical supplying system of the mass preparation type, it is recognized as a problem that particles or metal contaminations are produced from various liquid-contacting portions of components of all devices including storage tanks, pipes, joints, pumps, heat exchangers, flow meters, filters, and de-aerating modules.

On the other hand, an enhanced cleaning speed in a substrate cleaning apparatus for cleaning a semiconductor wafer or the like causes a problem in that the whole apparatus is increased in size and complicated. Particularly, a piping system which is configured by various devices is placed in a clean room, and hence requested to be miniaturized and made more compact.

In various tube devices, since metal materials are often used, metal contaminations are produced, and the device shape is fixed. Therefore, the piping system has a low degree of freedom in design, a dead space is easily caused in pipes, and the piping system tends to be increased in size. As a result, in such tube devices including machines such as a cleaning apparatuses, reductions in size and cost are limited. Moreover, there is no device having a shape which can flexibly satisfy a request for modifying an existing piping system. Consequently, modification of a piping system is largely restricted in space.

In the heat exchanger (tube device) in which the interfaces between the end portions of the shell 72 and the lid members 74 are sealed by fastening the nuts 75 to the metal fastening members 73 such as tie rods or through bolts, a large number of components are used for attaining the sealing, and hence the cost and size of the casing structure are increased. In the case where the heat exchanger is installed in a place which is exposed to the sulfuric acid atmosphere or the like, the metal fastening members 73 easily corrode and metal pollution inevitably occurs. Recently, it is therefore highly requested to restrict the use of such metal fastening members in, particularly, the field of semiconductor devices.

In order to avoid loosing of the metal fastening members 73, it is necessary to periodically refasten the metal fastening members 73. However, the metal fastening members 73 are generally used in a plural or at least four numbers, and hence the degrees of refastenings of the metal fastening members 73 are easily dispersed. This dispersion may cause the lid members 74 and the shell 72 to be deformed. When the lid members 74 or the shell 72 is deformed, twisting or distortion is produced between the end portions of the shell 72 and the lid members 74, thereby causing a problem in that local stress concentration occurs to promote development of creep. Moreover, the center axis of a metal tie rod serving as one of the metal fastening members 73 fails to coincide with that of a metal sheath for the tie rod, and the rod and the sheath rub with each other to cause problems in that the sliding resistance is increased, and that abrasion dust containing metal powder is produced. When the shell 72 or the lid members 74 are deformed, such a component must be replaced with a new one. Usually, these components are formed as machined articles, and therefore relatively expensive. Consequently, the heat exchanger has a configuration where reuse in which a device element (for example, the heat exchange pipes 70) remains to be used also after the casing structure is replaced with a new one is hardly conducted.

In the heat exchanger having the connecting structure in which the O-rings 76 serving as sealing members are interposed between the end portions of the shell 72 and the butting faces of the lid members 74, the corrosion resistance and the service temperature range are restricted by the use of the O-rings 76. For example, chemical of a high temperature cannot be passed through a space which is in contact with the O-rings 76. Furthermore, dust produced from the O-rings 76 may cause a pollution problem. In the recent field of semiconductor devices, therefore, it is highly requested to restrict the use of such O-rings.

In the case where a heat exchanger of this kind is to be used for chemical or the like, the shell 72, the lid members 74, and like components are often made of a fluororesin having excellent corrosion resistance, such as PTFE or PFA. However, a fluororesin has high lubricity, and hence creep due to vibration or heat of a pipe occurs in the connecting portions between the shell 72 and the lid members 74. As a result, there arises a problem in that the metal fastening members 73 such as tie rods or through bolts are loosened and fluid leakage from the connecting portions in the ends of the shell 72 is caused.

Alternatively, thread sealing or welding may be employed as the casing connecting structure between the shell 72 and the lid members 74. However, these measures are not highly effective. In a sealing structure which is based simply on threads, a high sealing property cannot be obtained, the pressure resistance is not sufficiently high, and leakage due to creep easily occurs. Usually, welding requires a skilled technique, and cannot be conducted by an easy work. Therefore, the structure due to welding has problems in that the production efficiency is low, that the onsite workability is poor, and that it is difficult to conduct maintenance and inspection on the site.

The invention has been conducted in order to solve the problems. It is an object of the invention to provide a tube device in which metal members such as a metal fastening member are not used and all components can be made of a synthetic resin, whereby the problems of metal elution and production of metal abrasion powder can be solved, and which is preferably used in an apparatus for producing semiconductor devices, and also a piping system including such a tube device.

It is another object of the invention to provide a tube device which can reduce the sizes of various devices, and miniaturize and compactly form a piping system, and which is preferably used in an apparatus for producing semiconductor devices, and also a piping system including such a tube device.

It is a further object of the invention to provide a tube device in which the number of components, and the production cost can be reduced without using a metal fastening member such as a tie rod or a through bolt, and an O-ring, which has a casing structure of high pressure resistance, and a sealing structure of high reliability, and which is preferably used in an apparatus for producing semiconductor devices, and also a piping system including such a tube device.

It is a still further object of the invention to provide a tube device which, even when all components are made of a fluororesin, can ensure a high sealing property, and can be applied to and installed in a chemically resistant atmosphere, and also a piping system including such a tube device.

BRIEF SUMMARY OF THE INVENTION

The tube device of the invention is a tube device including a casing, and a device element which is placed in the casing, wherein the casing comprises: a tube made of a synthetic resin; a pair of lid members which are made of a synthetic resin, and each of which comprises a receiving port for receiving an end portion of the tube, and at least one sealing face disposed in the receiving port; a pair of union nuts which are made of a synthetic resin, which are fitted onto one and other end portions of the tube, and which are screwed to end portions of the lid members having the receiving ports, respectively; and a sealing portion which is formed in at least one place for each of the end portions of the tube by closely contacting the end portion of the tube with the sealing face of corresponding one of the lid members, the end portion of the tube and the sealing face of the lid member being closely contacted with each other by causing corresponding one of the union nuts to press the tube from an outside of the tube, the union nut fastening the end portion of the lid member by screw advancement toward the end portion of the lid member, thereby pressing the tube from the outside of the tube. According to the configuration, it is possible to attain the objects.

The piping system of the invention includes a pipe conduit, and the abovementioned tube device which is placed in a middle of the pipe conduit.

In this case, all of the tube, the lid members, and the union nuts may be molded of a fluororesin having excellent heat resistance and corrosion resistance, or an antistatic fluororesin containing an electrically conductive material.

Examples of the device element are as follows. For example, the device element may be configured by: a heat exchange tube which is made of a fluororesin, and which is passed through the casing; and connecting portions to which pipes for introducing and discharging a fluid that is passed between an inner side of the casing and an outer side of the heat exchange tube are connected, respectively. According to the configuration, the tube device can be configured as a heat exchanger. When the device element is a filter member housed in the casing, the tube device can be configured as a filter device. When the device element is configured by an ultrasonic oscillator and an ultrasonic receiver which are used for an ultrasonic flow meter, and which are incorporated in the lid members in the ends of the tube, respectively, the tube device can be configured as an ultrasonic flow meter. When the device element is an air vent valve incorporated in one of the lid members, the tube device can be configured as a de-aerating device. When the device element is configured by gas permeable tubes which are passed through the tube, and a de-aerating port which is disposed in one of the lid members, the tube device can be configured as a de-aerating module. When the device element is configured by gas permeable tubes which are passed through the tube, and a soluble gas supplying port which is disposed in one of the lid members, the tube device can be configured as a gas dissolving device.

The thus configured tube device can be surely hermetically sealed by the sealing portion in which the end portion of the tube and the sealing face of the lid member are closely contacted with each other by a simple operation of fastening the union nut to an end portion of the lid member. Therefore, it is possible to obtain a tube device in which, unlike the conventional art, the number of components, and the production cost can be reduced without using a metal fastening member such as a tie rod or a through bolt, and an O-ring, and which has a casing structure of high pressure resistance, and a sealing structure of high reliability, and also a piping system including such a tube device.

In the tube device, a pressure tight sealing structure in which, unlike the conventional casing connecting structure, tie rods or through bolts are not used, and a slim casing structure can be realized, and the sealing property can be uniformly ensured by refastening a single union nut. In the tube device, namely, a sealing structure which is higher in reliability than the case where tie rods or through bolts are used can be obtained simply by sealing each of the connecting portions between the end portions of the tube and the lid members with the single union nut. Moreover, the tube device having the slim casing enables a piping system to be miniaturized and compacted. In the tube device, the sealing property can be ensured at any time by refastening the union nuts, and hence the reliability is maintained to be high for a longer term as compared with the case where thread sealing or O-ring sealing is used. In the tube device, it is necessary only to conduct only simple means that the single union nut is refastened. Unlike the connecting structure due to welding, therefore, the work on the site is facilitated, and maintenance and inspection on the site can be easily conducted.

Since no metal member such as a metal fastening member is used, it is possible to solve the problems of metal elution and production of metal abrasion powder.

When the union nut is fastened, the whole outer circumference of the end portion of the tube can be uniformly pressed, and hence the tube and the lid member are prevented from being accidentally deformed. Therefore, it is possible to solve the problems of creep and replacement of these members.

When the union nut is loosened, the lid member can be easily detached from the end portion of the tube. Therefore, stagnate fluid which stagnates in the tube can be easily removed away.

In the tube device to be placed in a pipe conduit of the piping system, even when an internal pressure arises in the tube, the air tightness can be maintained simply by the fastening of the union nut, and fluid leakage can be prevented from occurring. Unlike the conventional art, therefore, the use of an O-ring can be eliminated, and all the components can be molded of a fluororesin. As a result, the tube device can sufficiently cope with high temperature and strong corrosive chemical, and can be applied to and installed in a chemically resistant atmosphere.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2a is a fragmentary view of an inlet port of the heat exchanger shown in FIG. 2;

FIG. 2b is a fragmentary view of an outlet port of the heat exchanger shown in FIG. 2;

DETAILED DESCRIPTION OF THE INVENTION

Preferred embodiments of the invention will be described with reference to the accompanying drawings.

Figure 1:
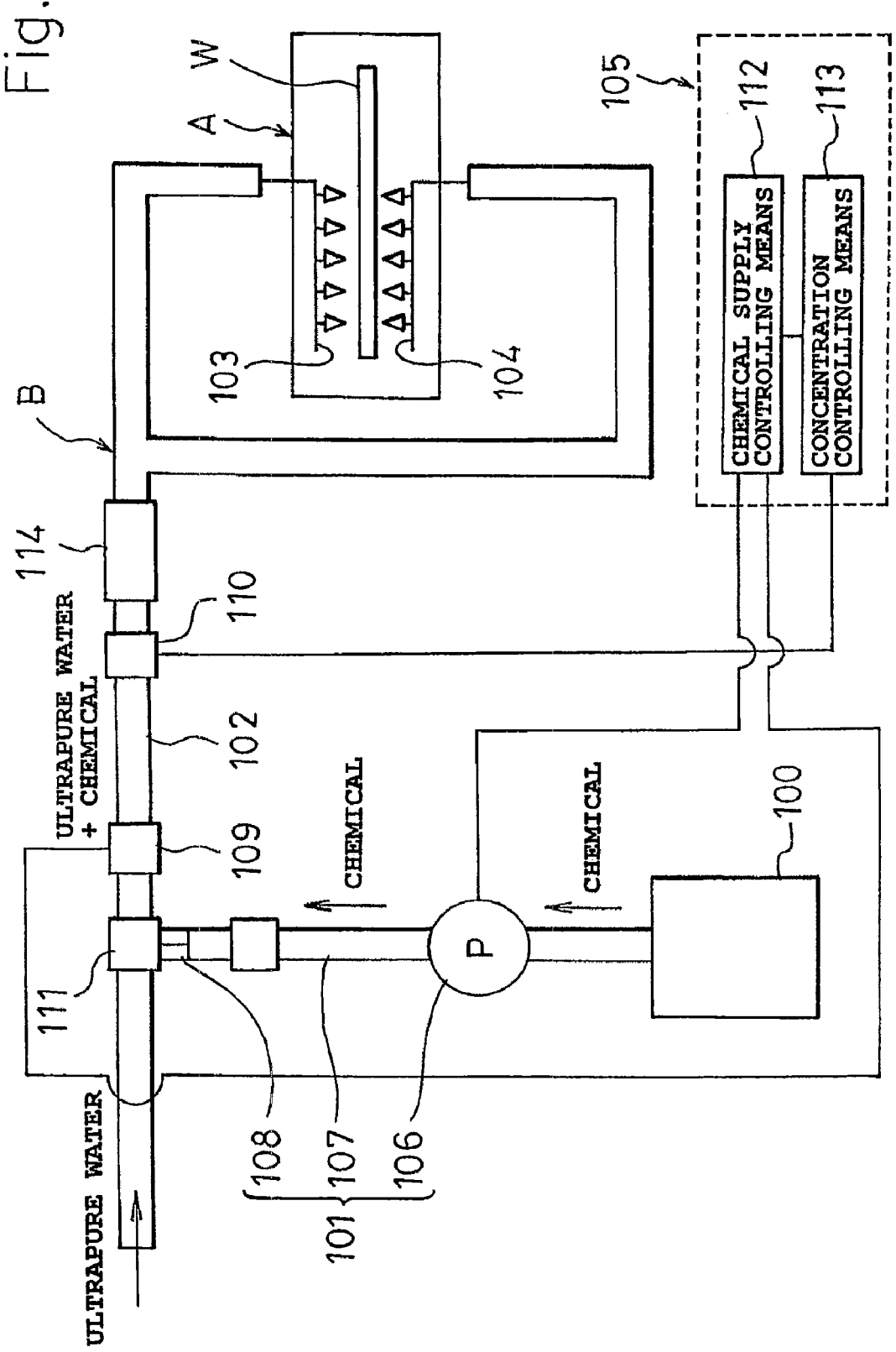
FIG. 1 is a diagram showing the whole configuration of an apparatus for cleaning a semiconductor wafer (substrate) including a chemical supply piping system which is an example of the piping system of the invention.

FIG. 1 is a diagram showing the whole configuration of an apparatus for cleaning a semiconductor wafer (substrate) including a chemical supply piping system which is an example of the piping system of the invention. In the figure, A denotes a cleaning chamber in which a wafer (substrate) W is disposed to be cleaned, and B denotes a chemical supply piping system which produces cleaning liquid of a desired concentration and supplies the liquid to the cleaning chamber A. The chemical supply piping system B comprises: a chemical storage tank 100 which stores chemical in an undiluted state; a chemical supplying apparatus 101 which is connected to the chemical storage tank 100, and which supplies the chemical; a supply pipe 102 which is connected to the chemical supplying apparatus 101, and which functions as a path of ultra pure water mixed with the chemical; a pair of ejection nozzles 103, 104 which are disposed in a downstream portion of the supply pipe 102 so as to be opposed to surfaces of the wafer W disposed in the cleaning chamber A; and a control system 105 which adjusts various states such as the concentration and flow amount of the cleaning liquid supplied from the ejection nozzles 103, 104.

The chemical supplying apparatus 101 comprises: a chemical supplying pump 106; a connecting pipe 107 which connects the supply pipe 102 to the chemical supplying pump 106 to form a flow path; and a capillary 108 which directly connects the interior of the connecting pipe 107 to that of the supply pipe 102. When the chemical supplying pump 106 is driven, the chemical is ejected from the capillary 108 into the ultra pure water in the supply pipe 102.

In the supply pipe 102, disposed are: flow amount adjusting means 109 for adjusting the flow amount of the ultra pure water passed through the supply pipe 102; concentration adjusting means 110 for adjusting the concentration of the cleaning liquid passed through the supply pipe 102; and mixing means 111, placed in a portion where the supply pipe 102 and the capillary 108 are connected to each other, for producing a rotating flow in the cleaning liquid to stir it, thereby uniformalizing the cleaning liquid.

The control system 105 comprises: chemical supply controlling means 112 for adjusting the amount of the chemical to be supplied to the ultra pure water by the chemical supplying pump 106, and for driving the flow amount adjusting means 109; and concentration controlling means 113 for driving the concentration adjusting means 110. The chemical supply controlling means 112 and the concentration controlling means 113 are connected to each other. A result of the concentration control by the concentration controlling means 113 is fed back to the chemical supply controlling means 112 to control the chemical supplying pump 106, whereby the supply amount of the chemical is adjusted.

The invention is characterized in that a tube device selected from various kinds of tube devices is disposed in an adequate place of the pipes in the chemical supply piping system B, and the tube device is configured in the following manner.

Figure 2:
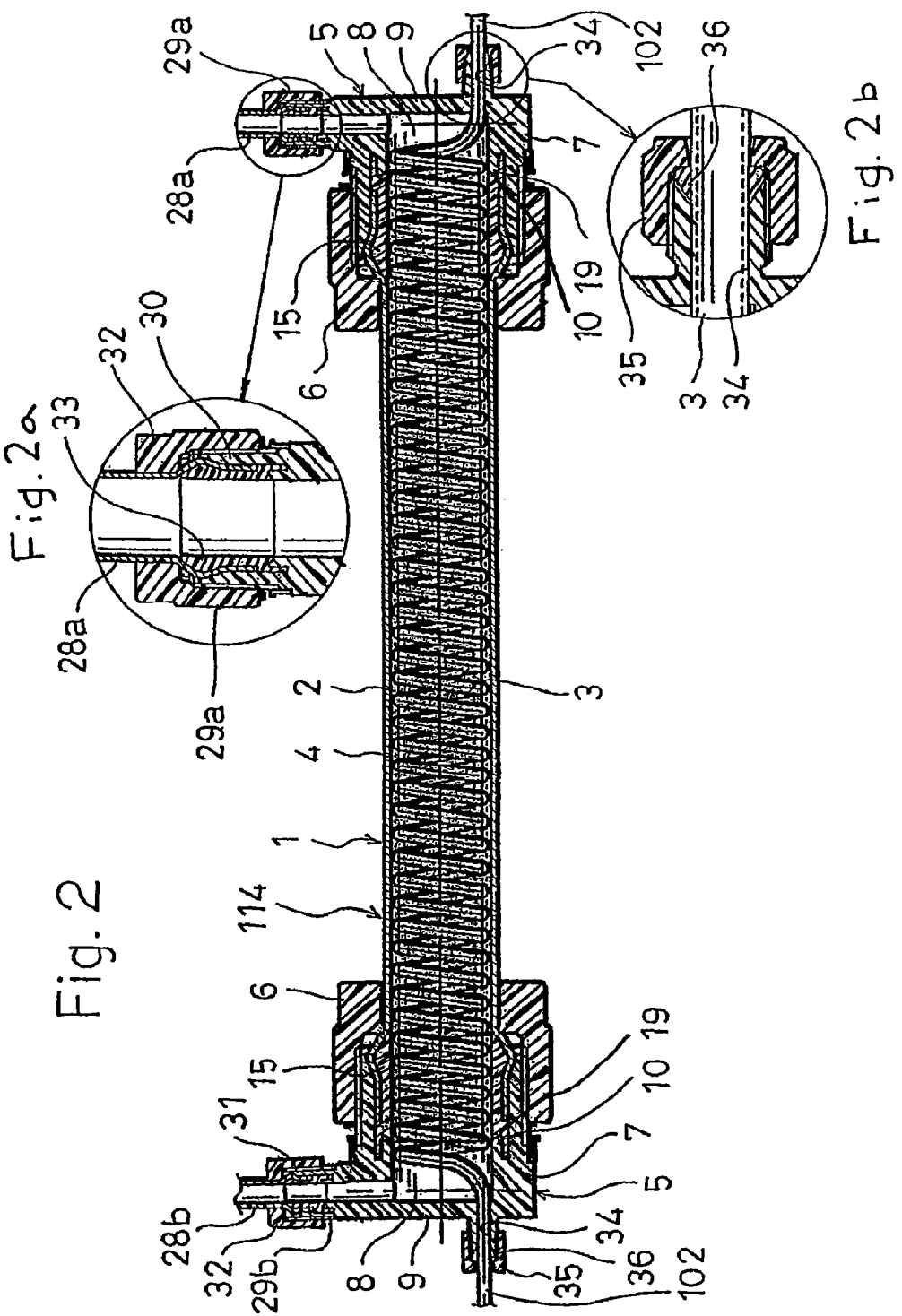
FIG. 2 is a section view of a heat exchanger which is an example of the tube device of the embodiment of the invention shown in FIG. 1.

FIG. 1 shows an embodiment in which a heat exchanger 114 that is a tube device is disposed in the middle of the supply pipe 102 that is a pipe of the chemical supply piping system B. As shown in FIG. 2, the heat exchanger 114 conducts heat exchange between a fluid passed through a heat exchange tube 3 which is passed through the interior (heat exchange chamber) 2 of a casing 1, and that is passed between the interior of the casing 1 and the outside of the heat exchange tube 3.

Figure 3:
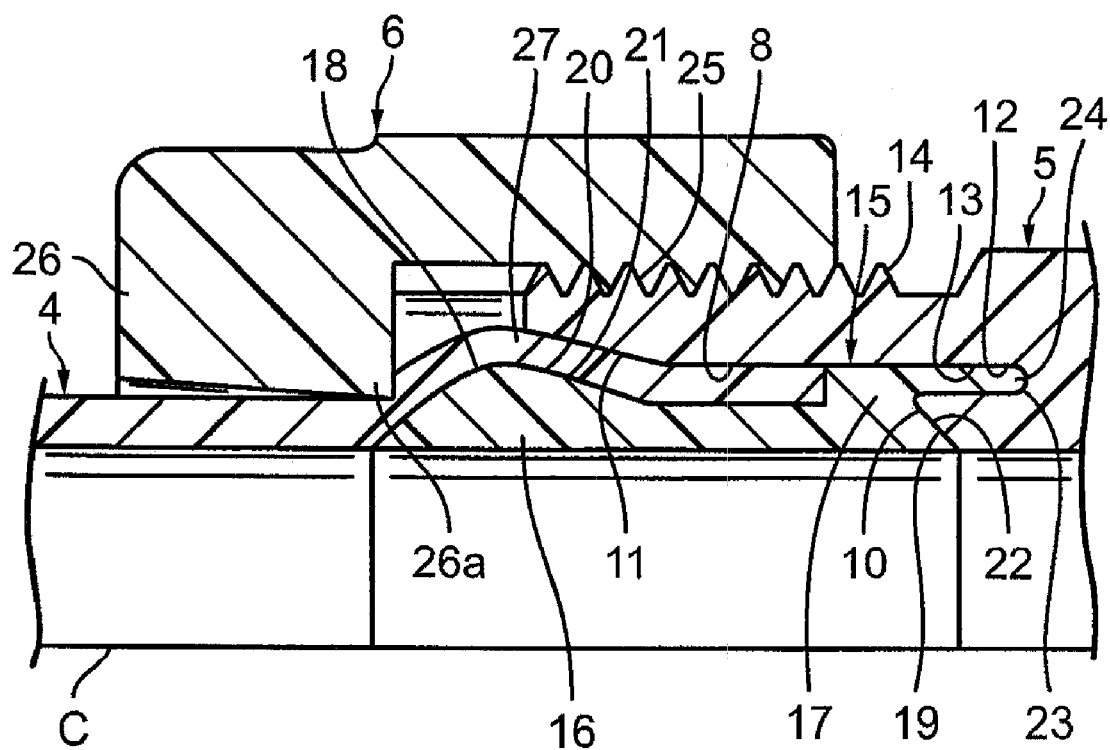
FIG. 3 is an enlarged section view of a structure for connecting an end portion of a tube and a lid member of the heat exchanger of FIG. 2.

As shown in FIGS. 2 and 3, the casing 1 comprises: a tube 4 surrounding the outer periphery of the heat exchange tube 3; a pair of lid members 5 which hermetically close one and other end portions of the tube 4, respectively; and union nuts 6 which fasten the lid members 5 to the end portions of the tube 4, respectively.

The tube 4 is molded of a synthetic resin, for example, a fluororesin having excellent heat resistance and corrosion resistance, such as PFA or PTFE, or an antistatic fluororesin containing an electrically conductive material, into a cylindrical shape. The lid members 5 which are similarly made of a synthetic resin such as a fluororesin are inserted into the end portions of the tube 4, and connected thereto by fastening the union nuts 6 made of a synthetic resin such as a fluororesin, respectively.

Each of the lid members 5 is formed into a shape having: a body wall portion 7; a receiving portion 8 which is opened in one end of the body wall portion 7; and a bottom wall portion 9 which closes the other end of the body wall portion 7. As shown in FIG. 3, first to third sealing faces 10 to 12 are disposed inside the receiving portion 8 of the lid member 5. The first sealing face 10 is configured by a tapered face which is formed inner than the entrance of the receiving portion 8 of the lid member 5, and in which the diameter is gradually increased so as to intersect with the axis C of the lid member 5, or toward the outer side in the direction of the axis C. The second sealing face 11 is configured by a tapered face which is formed in the entrance of the receiving portion 8, and in which the diameter is gradually increased so as to intersect with the axis C, or toward the outer side in the direction of the axis C. The third sealing face 12 is configured by an annular groove 13 which is formed in an inner portion of the receiving portion 8 of the lid member 5 and in the radially outer side with respect to the first sealing face 10, and which elongates parallel to the axis C. An external thread portion 14 is formed on the outer periphery of the receiving portion 8 of the lid member 5.

On the other hand, inner rings 15 made of a synthetic resin such as a fluororesin are pressingly inserted into the one and other end portions of the tube 4, respectively. As shown in FIG. 3, the inner rings 15 are formed into a sleeve-like shape having: a press-insertion portion 16 which has an abacus beadlike section shape, and which is to be pressingly inserted into the corresponding end portion of the tube 4 to increase the diameter of the end portion, thereby expanding the end portion so as to have a mountain-like section shape; and a projection portion 17 which is continuous to the press insertion portion 16, and which is to project from the end portion of the tube 4. In the press insertion portion 16 having an abacus beadlike section shape, an outward tapered face 18 is formed on one inclined face of the portion, and an inward tapered face 20 which cooperates with the second sealing face 11 to pressingly hold the end portion of the tube 4 in an inclined state to form a second sealing portion 21 is formed on the other inclined face. A projection end face 22 formed by a tapered face which butts against the first sealing face 10 to be in close contact therewith to form a first sealing portion 19, and a cylindrical portion 24 which is to be fitted into the annular groove 13 to form a third sealing portion 23 are formed in the tip end of the projection portion 17. The inner diameter of the inner ring 15 is set to be equal to or substantially equal to that of the tube 4, thereby allowing the fluid flowing through the inner ring 15 and the tube 4 to smoothly flow without stagnating in the interface between the inner ring 15 and the tube 4.

As shown in FIG. 3, an internal thread portion 25 which is to be screwed with the external thread portion 14 of the lid member 5 is formed in the internal periphery of the union nut 6, an annular flange 26 is inwardly projected from one end portion of the union nut 6, and a pressing edge 26a having an acute or right angle is disposed in an axially inner end of the inner peripheral face of the annular flange 26.

The end portion of the tube 4 into which the inner ring 15 is pressingly inserted is inserted into the receiving portion 8 of the lid member 5, and the internal thread portion 25 of the union nut 6 which is previously loosely fitted to the outer periphery of the end portion of the tube 4 is screwed with the external thread portion 14 of the lid member 5 to be fastened up. In accordance with this fastening, the pressing edge 26a of the union nut 6 butts against an expansion basal portion of a long diameter portion 27 of the tube 4 to axially press the inner ring 15. As a result, as shown in FIG. 3, the projection end face 22 of the inner ring 15 is pressed against the first sealing face 10 of the lid member 5 to form the first sealing portion 19, and the end portion of the tube 4 is pressingly held in an inclined state between the inward tapered face 20 of the inner ring 15 and the second sealing face 11 of the lid member 5, thereby forming the second sealing portion 21. Furthermore, the cylindrical portion 24 of the inner ring 15 is pressingly inserted into the annular groove 13 to form the third sealing portion 23. The first to third sealing portions 19, 21, 23 exert a sealing function of high reliability.

As shown in FIG. 2, the lid member 5 in the one end portion of the tube 4 comprises a connecting portion 29a to which a heat exchange fluid inlet pipe 28a that is another pipe is to be connected, and the lid member 5 in the other end portion comprises a connecting portion 29b to which an outlet pipe 28b that is another pipe is to be connected. The connecting portions 29a, 29b which are to be connected to other pipes are configured in the following manner. An inlet port 30 for a heat exchange fluid such as temperature controlled water is formed in the body wall portion 7 of the one lid member 5, and an outlet port 31 is formed in the body wall portion 7 of the one lid member 5. End portions of the heat exchange fluid inlet and outlet pipes 28a, 28b are connected respectively to the inlet and outlet ports 30, 31 via a union nut 32 and an inner ring 33 which are made of a synthetic resin such as a fluororesin, so that the heat exchange fluid flows through the inlet port 30, the heat exchange chamber 2 of the tube 4, and the outlet port 31 in this sequence.

The internal structures of the inlet port 30 and the outlet port 31 are configured in the same manner as the internal structures (except the diameters) of the receiving portions 8 of the lid members 5. The inner rings 33 which are identical in section shape as the inner rings 15 for the end portions of the tube 4 are pressingly inserted into end portions of the heat exchange fluid inlet and outlet pipes 28a, 28b, respectively. In the end portions of the inlet and outlet pipes 28a, 28b, the structures for connecting with the inlet port 30 and the outlet port 31 are identical with those of the end portions of the tube 4 for connecting with the receiving portions 8 of the lid members 5, and hence their detailed description is omitted. Alternatively, other means such as that for directly welding or screwing the end portions of the heat exchange fluid inlet and outlet pipes 28a, 28b with the inlet port 30 and the outlet port 31 may be employed as the structures for connecting the end portions of the heat exchange fluid inlet and outlet pipes 28a, 28b to the inlet port 30 and the outlet port 31. Namely, the connecting portions 29a, 29b may be realized by connecting means such as welding or screw connection.

Referring to FIGS. 2, 2a and 2b, the heat exchange tube 3 formed by a coil tube which is made of a synthetic resin such as a fluororesin, and through which chemical is to flow is passed through the interior of the tube 4. The end portions of the heat exchange tube 3 are led out from outlet ports 34 which are opened in the bottom wall portions 9 of the lid members 5, respectively, and then connected to a middle portion of the supply pipe 102 of the pipe conduit of the chemical supply piping system B, as shown in FIG. 1. Union nuts 35 made of a synthetic resin such as a fluororesin are fitted onto the led-out end portions of the heat exchange tube 3, respectively. The union nuts 35 are fastened to the outlet ports 34 via ferrules 36 made of a synthetic resin such as a fluororesin, whereby the gaps between the outlet ports 34 and the end portion of the heat exchange tube 3 are hermetically sealed.

In the thus configured heat exchanger, heat exchange is conducted between a fluid such as chemical passed through the interior of the heat exchange tube 3, and the heat exchange fluid such as temperature controlled water passed through the outer side the heat exchange tube 3 in the cylindrical casing body of the tube 4. In place of the configuration in which a fluid such as chemical is passed through the inner side of the heat exchange tube 3 and the heat exchange fluid such as temperature controlled water is passed through the outer side of the heat exchange tube 3, an opposite configuration in which the heat exchange fluid such as temperature controlled water is passed through the inner side of the heat exchange tube 3, and a fluid such as chemical is passed through the outer side of the heat exchange tube 3 may be employed.

Figure 4:
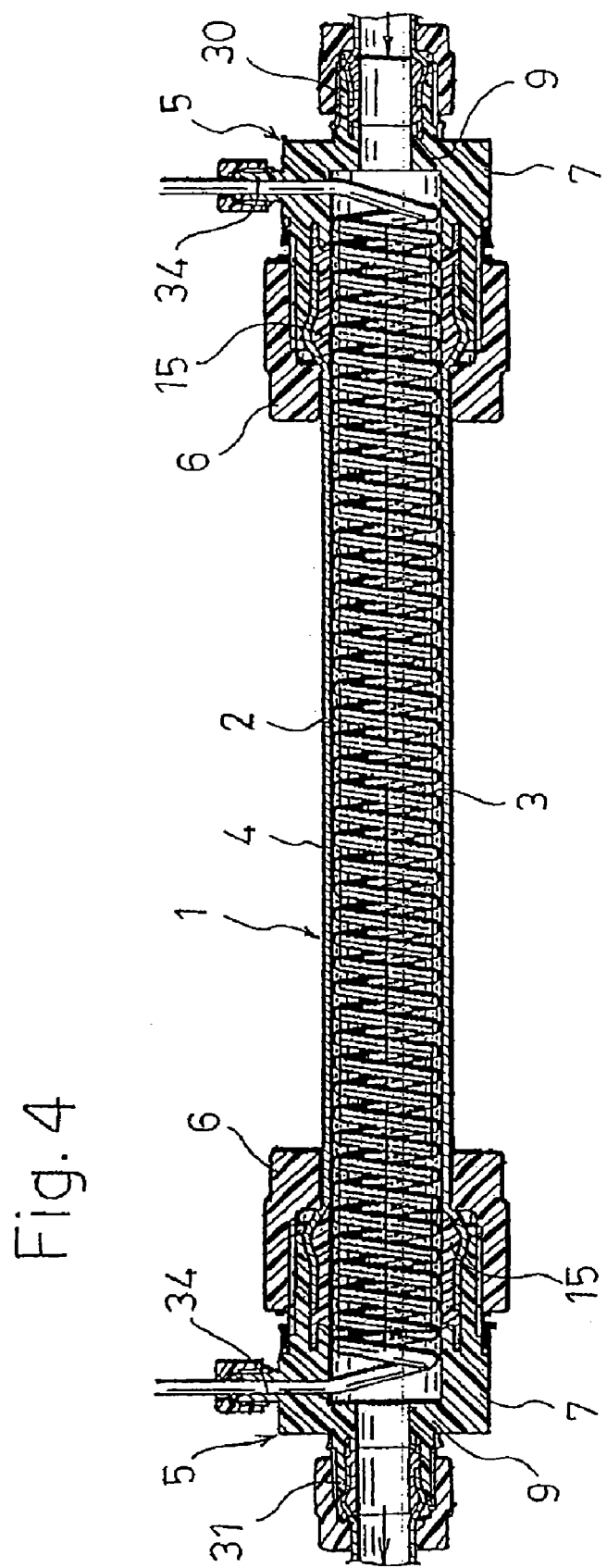
FIG. 4 is a section view showing another example of the heat exchange tube of the heat exchanger of FIG. 2 in a manner corresponding to FIG. 2.

As shown in FIG. 4, alternatively, the end portions of the heat exchange tube 3 may be led out from outlet ports 34 which are opened in the body wall portions 7 of the lid members 5, and the inlet and outlet ports 30, 31 for a fluid such as chemical may be disposed in the bottom wall portions 9 of the lid members 5, respectively.

Figure 5:
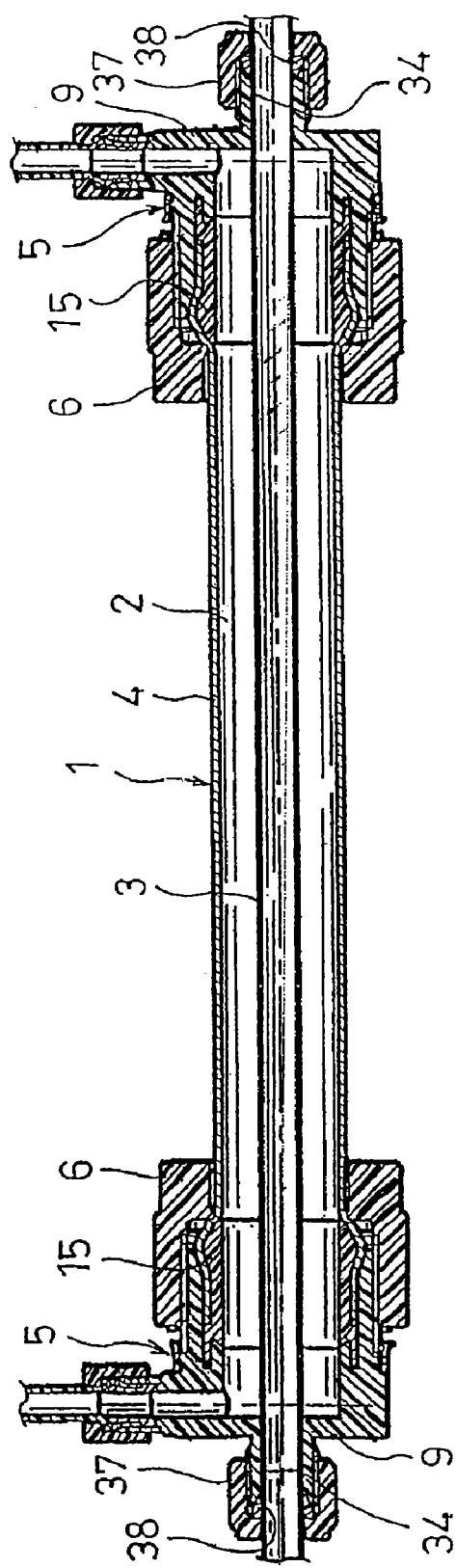
FIG. 5 is a section view showing a further example of the heat exchange tube of the heat exchanger of FIG. 2 in a manner corresponding to FIG. 2.

As shown in FIG. 5, alternatively, the heat exchange tube 3 through which a fluid such as chemical or the heat exchange fluid such as temperature controlled water is passed may be formed by a single straight tube made of a fluororesin. In the alternative also, in the same manner as the case shown in FIG. 3 in which the heat exchange tube is formed by a coil tube, the end portions of the heat exchange tube 3 are led out from outlet ports 34 which are opened in the bottom wall portions 9 of the lid members 5. Union nuts 37 made of a synthetic resin such as a fluororesin are fitted onto the led-out end portions of the heat exchange tube 3, respectively. The union nuts 37 are fastened to the outlet ports 34 via ferrules 38 made of a synthetic resin such as a fluororesin, whereby the gaps between the outlet ports 34 and the end portions of the heat exchange tube 3 are hermetically sealed.

Figure 6:
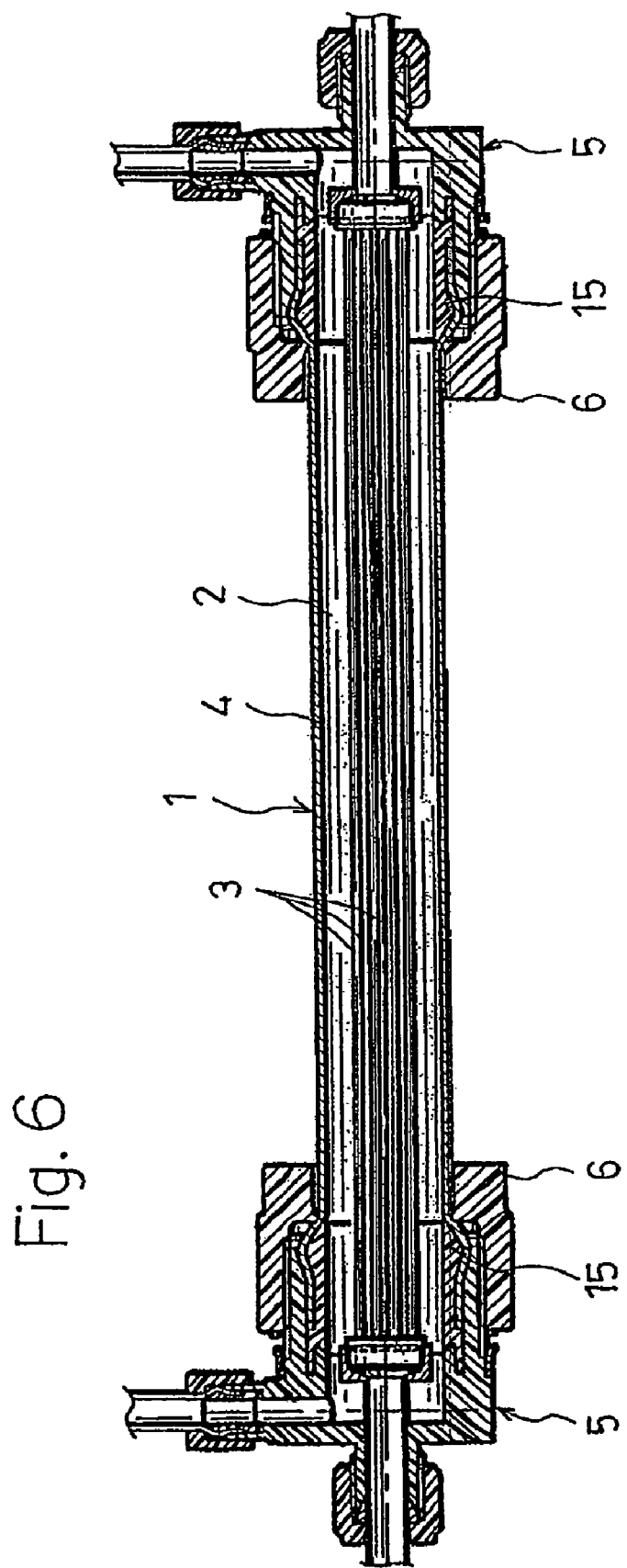
FIG. 6 is a section view showing a still further example of the heat exchange tube of the heat exchanger of FIG. 2 in a manner corresponding to FIG. 2.
Figure 20:
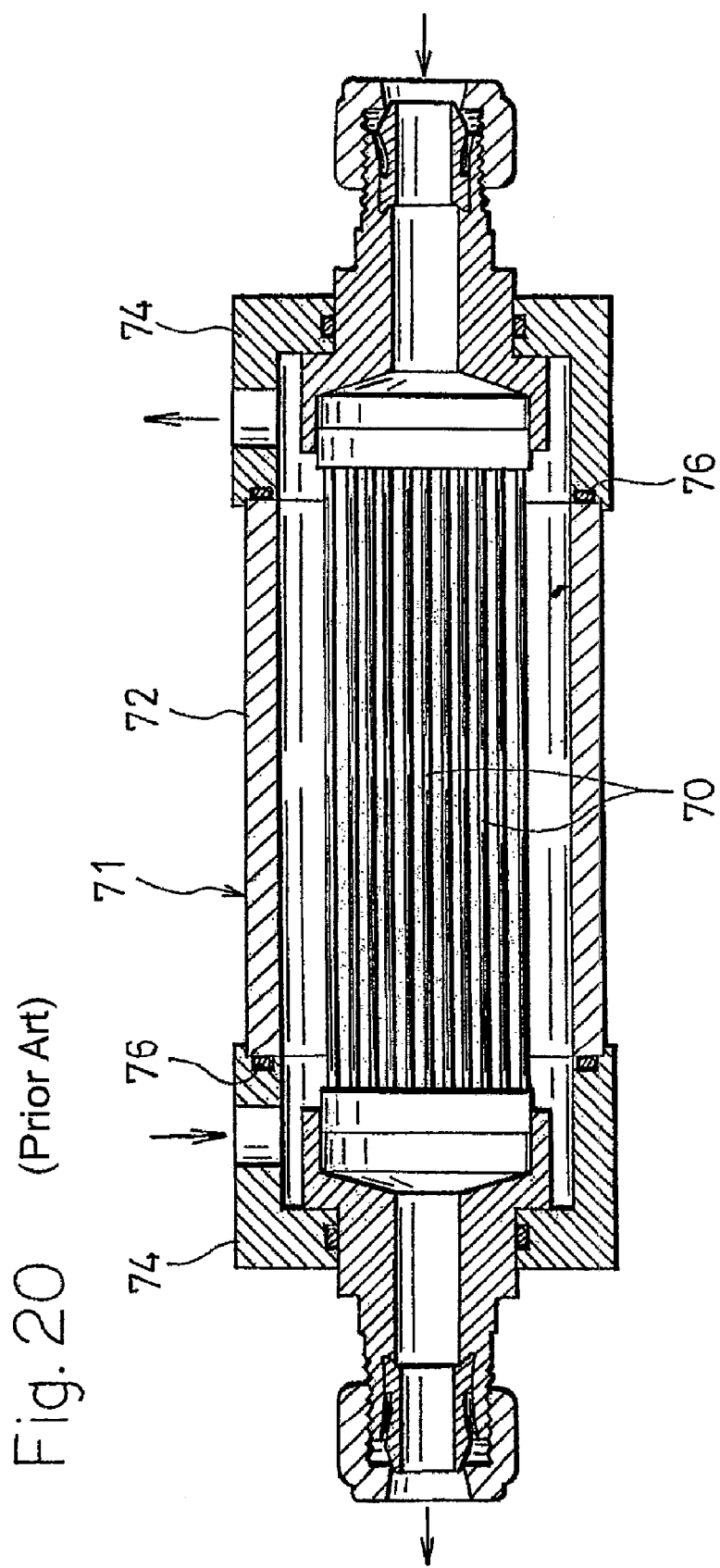
FIG. 20 is a section view of the heat exchanger of FIG. 19.

As shown in FIG. 6, alternatively, the heat exchange tube 3 through which a fluid such as chemical or the heat exchange fluid such as temperature controlled water is passed may be formed by plural straight tubes made of a fluororesin which are similar to those in the conventional heat exchanger shown in FIG. 20.

Other Embodiments of the Tube Device

Figure 7:
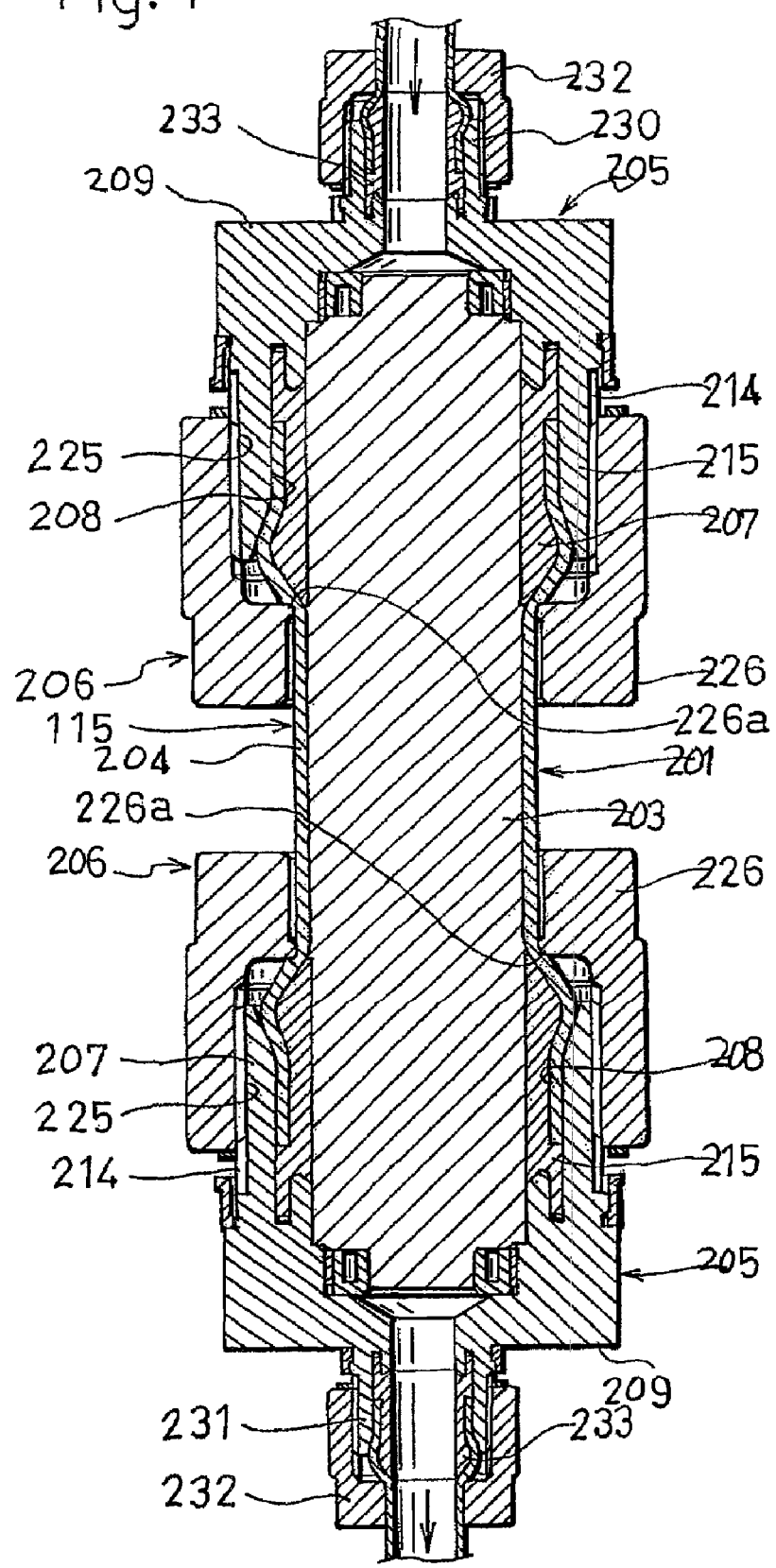
FIG. 7 is a section view of a filter device which is another example of the tube device of the embodiment of the invention.
Figure 8:
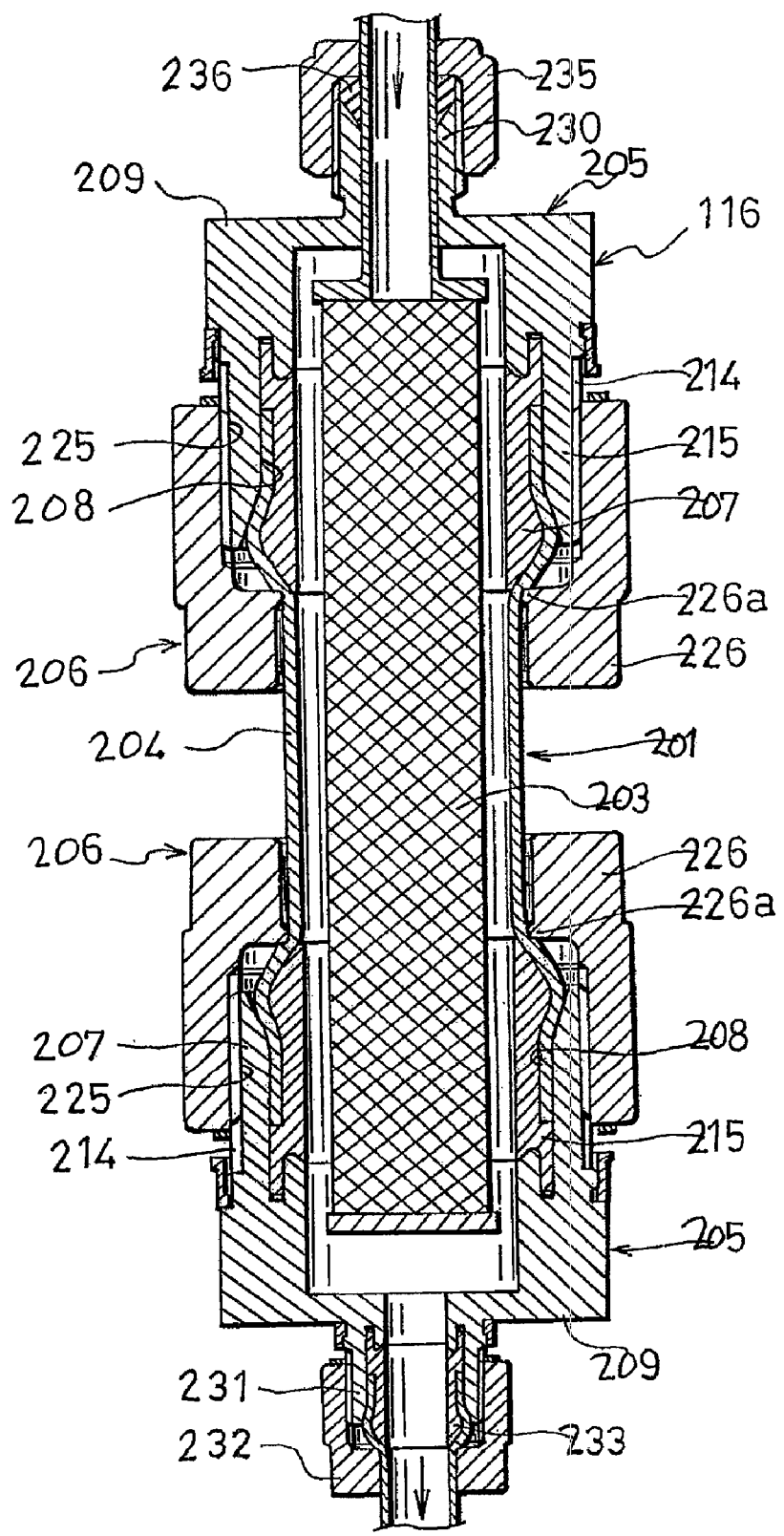
FIG. 8 is a section view showing another example of the filter device of the embodiment of the invention.
Figure 9:
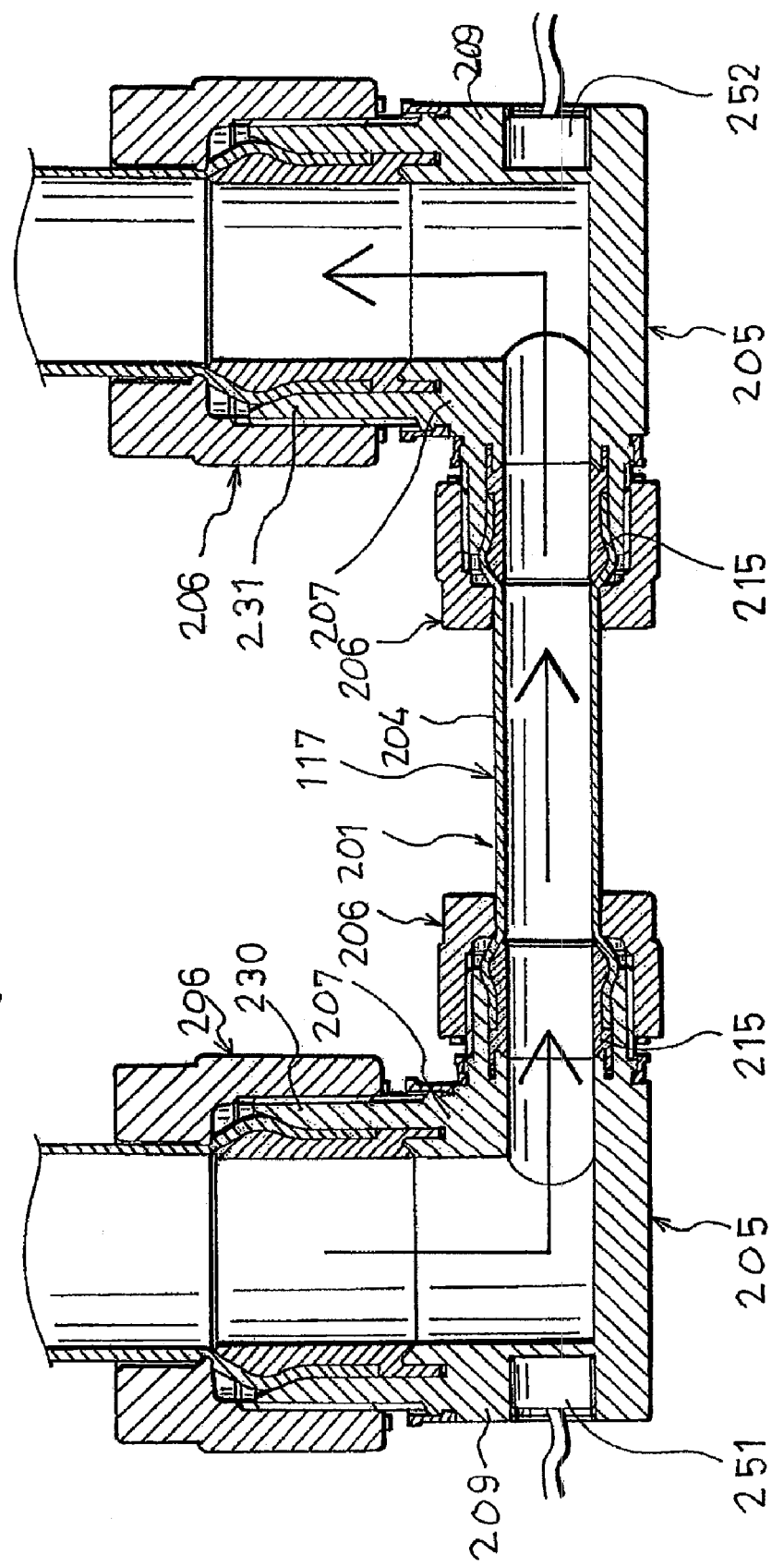
FIG. 9 is a section view of an ultrasonic flow meter which is a further example of the tube device of the embodiment of the invention.
Figure 10:
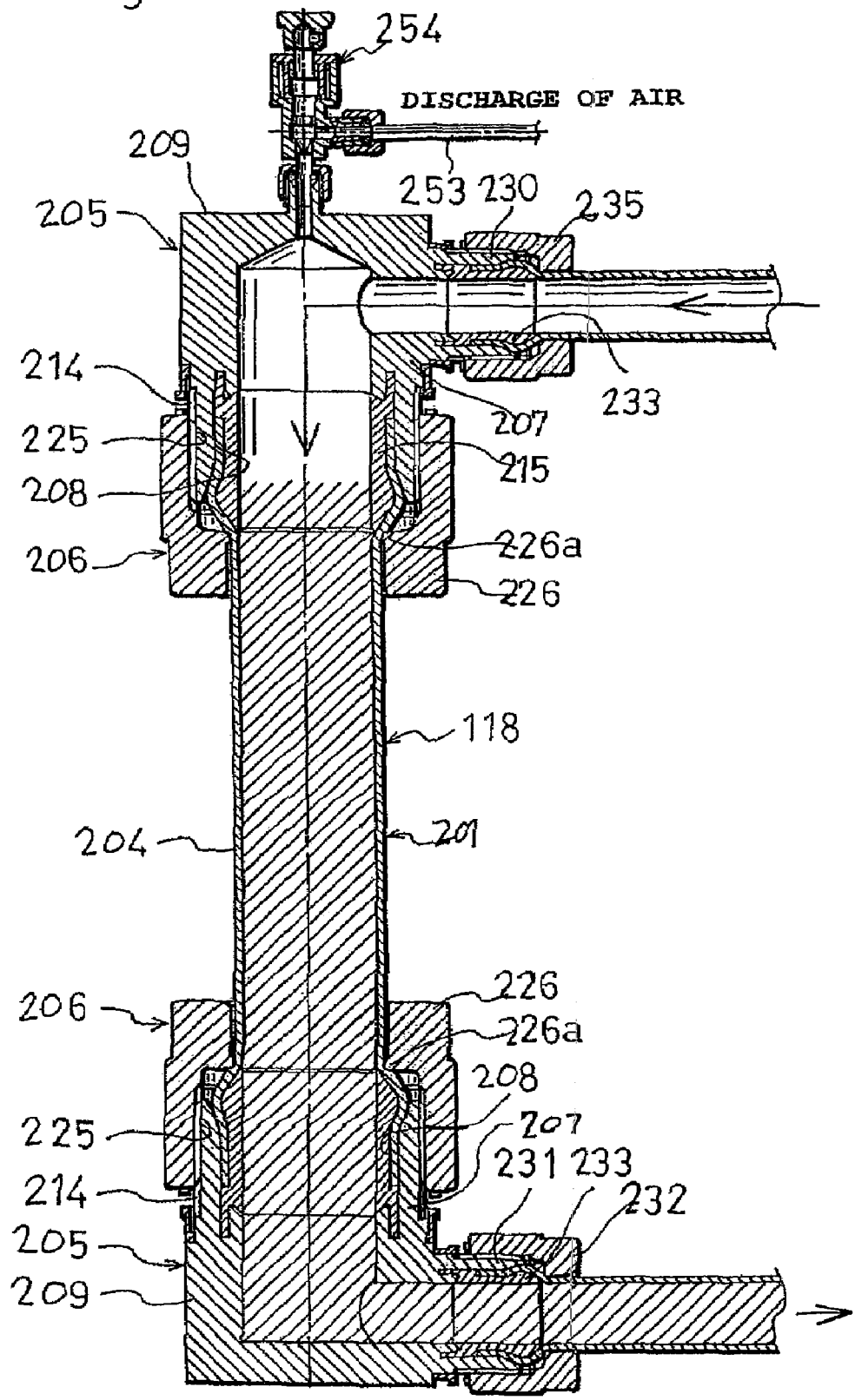
FIG. 10 is a section view of a manual de-aerating device which is a still further example of the tube device of the embodiment of the invention.
Figure 11:
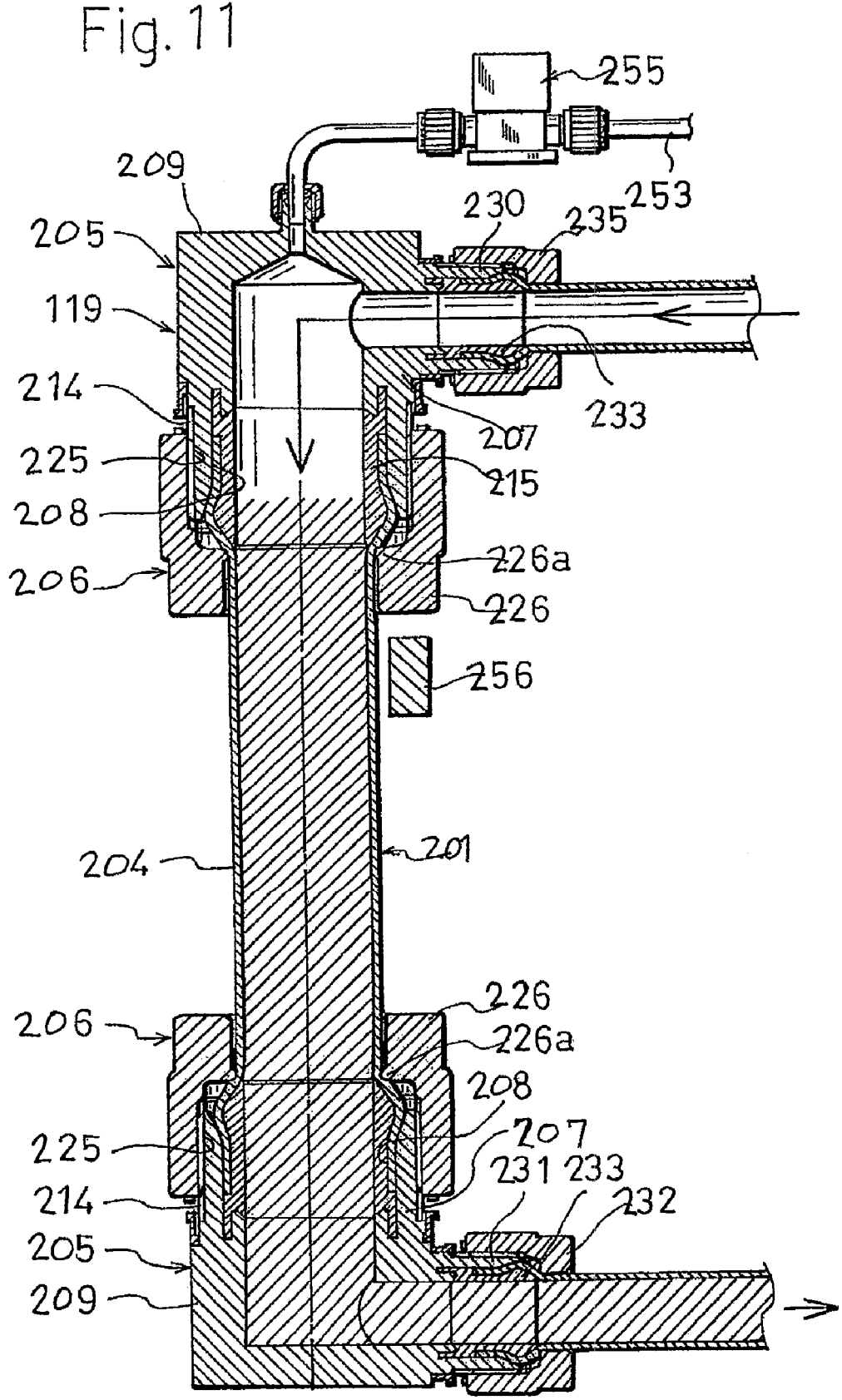
FIG. 11 is a section view of an automatic de-aerating device which is a still further example of the tube device of the embodiment of the invention.
Figure 12:
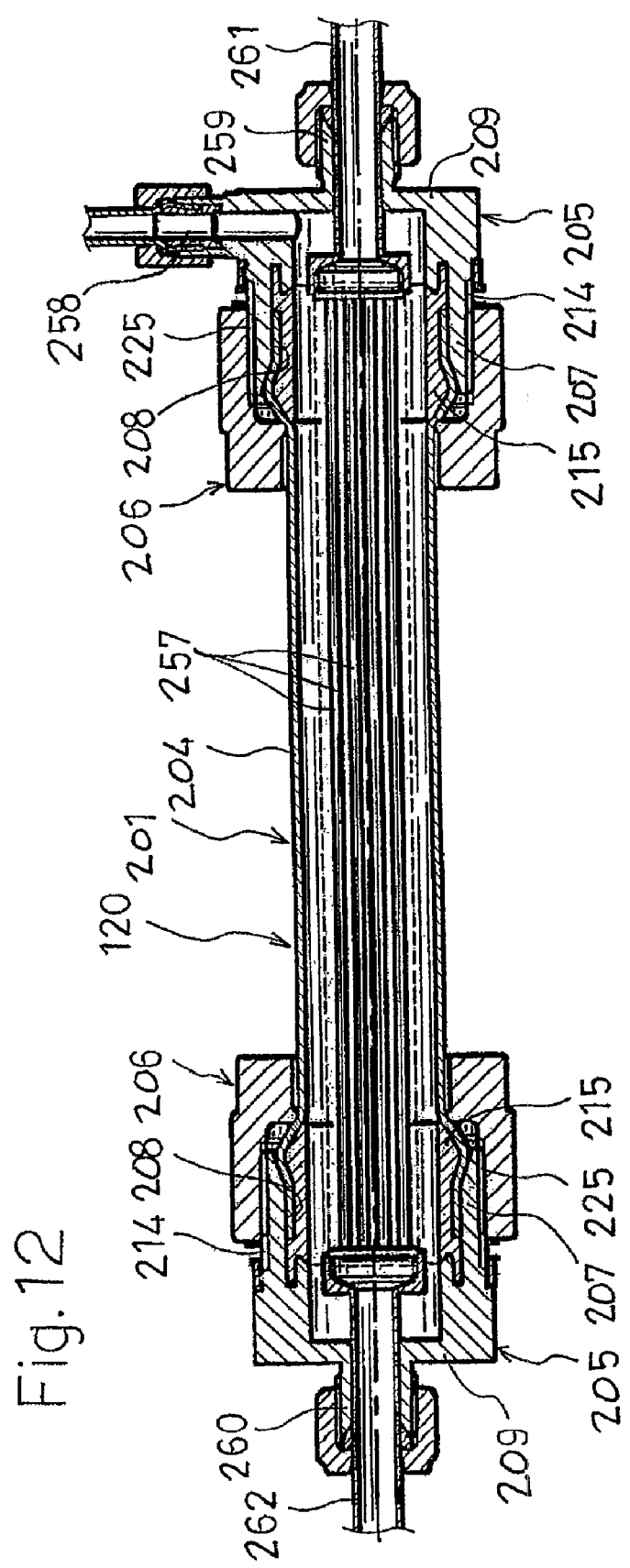
FIG. 12 is a section view of a de-aerating module which is a still further example of the tube device of the embodiment of the invention.

In place of the heat exchanger 114, other devices such as filter devices shown in FIGS. 7 and 8, an ultrasonic flow meter shown in FIG. 9, a manual de-aerating device shown in FIG. 10, an automatic de-aerating device shown in FIG. 11, and a de-aerating module shown in FIG. 12 may be employed as the tube device. Each of the devices is disposed in an adequate place of the pipe conduit in the chemical supply piping system B in accordance with its unique function.

Referring to FIG. 7, in the filter device 115, a filter member 203 serving as a device element is housed in the casing 201. For example, the filter member 203 is configured in the following manner. Functional powder of ceramics, activated charcoal, titanium oxide, or a like material is carried in a carrier such as synthetic fibers. For example, pure water which flows into the casing from the inlet port 230 disposed in the lid member 205 is passed through the filter member 203 to be converted to ultra pure water. Alternatively, an ion-exchange resin such as silica gel may be carried in a carrier, and pure water or chemical which flows into the casing from the inlet port 230 is passed through the filter member 203 to remove away metal ions contained in the pure water or chemical.

The casing 201 of the filter device 115 comprises: the tube 204; the lid members 205 which hermetically close the both end portions of the tube 204, respectively; and the union nuts 206 which fasten the lid members 205 to the end portions of the tube 204, respectively. The inlet port 230 and the outlet port 231 disposed in the lid members 205 are connected to adequate places of the pipe conduit of the chemical supply piping system B, as shown in FIG. 1. The tube 204, the lid members 205, and the union nuts 235 are configured in the same manner as those of the heat exchanger 114 shown in FIG. 2. Therefore, the identical members and elements are denoted by the same reference numerals, and their description is omitted.

FIG. 8 shows another example of the filter device. In the filter device 116, the filter member 203 formed by a hollow fiber membrane serving as a device element is housed in the casing 201, and, for example, pure water is passed through the filter member 203 to be converted to ultra pure water. Other configuration is identical with that of the filter device 115 shown in FIG. 7. Therefore, the identical members and elements are denoted by the same reference numerals, and their description is omitted.

Referring to FIG. 9, in the ultrasonic flow meter 117, in the same manner as the case of the heat exchanger 114, the casing 201 comprises: the tube 204; the lid members 205 which hermetically close the both end portions of the tube 204, respectively; and the union nuts 206 which fasten the lid members 205 to the end portions of the tube 204, respectively. As a device element, an ultrasonic oscillator 251 for the ultrasonic flow meter is incorporated in the bottom wall portion 209 of one of the lid members 205 for the ends of the tube 204 of the casing 201, and an ultrasonic receiver 252 is incorporated in the bottom wall portion 209 of the other lid member 205.

The ultrasonic flow meter 117 can measure the flow amount on the basis of a phenomenon that an ultrasonic wave is Doppler-shifted by the flow of pure water, ultra pure water, chemical, or the like which enters into the casing from the inlet port 230 disposed in the body wall portion 207 of the one lid member 205, and flows through the tube 204 toward the outlet port 231 disposed in the other lid member 205. The inlet port 230 and the outlet port 231 disposed in the lid members 205 are connected to adequate places of the pipe conduit of the chemical supply piping system B, as shown in FIG. 1. The other structures such as the structure of the casing 201, and the structures for connecting the end portions of the tube 204 to the lid members 205 are identical with those of the heat exchanger 114. Therefore, like elements are designated by like numbers throughout. Further description is omitted for convenience only and is not limiting.

Referring to FIG. 10, in the manual de-aerating device 118, the casing 201 comprises: the tube 204 which is placed in a vertical posture; a pair of upper and lower lid members 205 which hermetically close the upper and lower end portions of the tube 204, respectively; and the union nuts 206 which fasten the lid members 205 to the upper and lower end portions of the tube 204, respectively. As a device element, the inlet port 230 is incorporated in the body wall portion 207 of the upper lid member 205, and an air vent tube 253 and a manual air vent valve 254 are incorporated in the bottom wall portion 209. The outlet port 231 is disposed in the body wall portion 207 of the lower lid member 205. In the manual de-aerating device 118, when the air vent valve 254 is opened, it is possible to remove away, for example, air bubbles in pure water, ultra pure water, or chemical, and which enters from the inlet port 230 of the upper lid member 205, stagnates in the tube 204, and then flows out to the outlet port 231 of the lower lid member 205. The inlet port 230 and the outlet port 231 disposed in the lid members 205 are connected to adequate places of the pipe conduit of the chemical supply piping system B, as shown in FIG. 1. The other structures such as the structure of the casing 201, and the structures for connecting the end portions of the tube 204 to the lid members 205 are identical with those of the heat exchanger 114. Therefore, the identical members and elements are denoted by the same reference numerals, and their description is omitted.

Referring to FIG. 11, in the automatic de-aerating device 119, an automatic air vent valve 255 which operates in conjunction with a liquid level sensor 256 disposed outside the tube 204 that is placed in a vertical posture is disposed in the air vent tube 253. When the liquid level sensor 56 detects the liquid level in the tube 204, the air vent valve 255 is opened, so that air stagnating in the liquid is discharged. The other configuration and function are identical with those of the manual de-aerating device of FIG. 10. Therefore, like elements are designated by like numbers throughout. Further description is omitted for convenience only and is not limiting.

Referring to FIG. 12, in the de-aerating module 120, as a device element, plural gas permeable tubes 257 made of a foamed fluororesin are passed in a bundled state through the tube 204, and a de-aerating port 258 is disposed in one of the lid members 205. The both ends of the gas permeable tubes 257 are communicatingly connected to an inflow pipe 261 and an outflow pipe 262 which are passed through inlet and outlet ports 259 and 260 disposed in the bottom wall portions 209 of the lid members 205 on the ends of the tube 204, respectively. The inflow pipe 261 and the outflow pipe 262 are connected to adequate places of the pipe conduit of the chemical supply piping system B, as shown in FIG. 1.

In the de-aerating module, while the pressure of the interior of the tube 204 is reduced through the de-aerating port 258 by a vacuum pump or the like, for example, chemical is passed from the inflow pipe 261 through the gas permeable tubes 257, and the de-aerating operation is conducted in such a manner that gasses such as air dissolved in the chemical permeate the peripheral walls of the gas permeable tubes 257 to be dissipated into the outside of the gas permeable tubes 257. The chemical which has undergone the de-aerating process is discharged into the outflow pipe 262. The other structures such as the structure of the casing 201, and the structures for connecting the end portions of the tube 204 to the lid members 205 are similar to those of the heat exchanger 114. Therefore, like elements are designated by like numbers throughout. Further description is omitted for convenience only and is not limiting.

The de-aerating module 120 shown in FIG. 12 can be used also as a gas dissolving device. When the module is used as a gas dissolving device, the de-aerating port 258 is used as a soluble gas supplying port, and, for example, ultra pure water or chemical is passed from the inflow pipe 261 through the gas permeable tubes 257 while a soluble gas such as ozone is supplied under pressure into the tube 204. The soluble gas in the tube 204 permeates the peripheral wall of the gas permeable tubes 257 to be dissolved into the ultra pure water or chemical in the gas permeable tubes 257. The to be processed liquid which has undergone the dissolving process is discharged into the outflow pipe 262.

Other Embodiments of the Casing of the Tube Device

Figure 13:
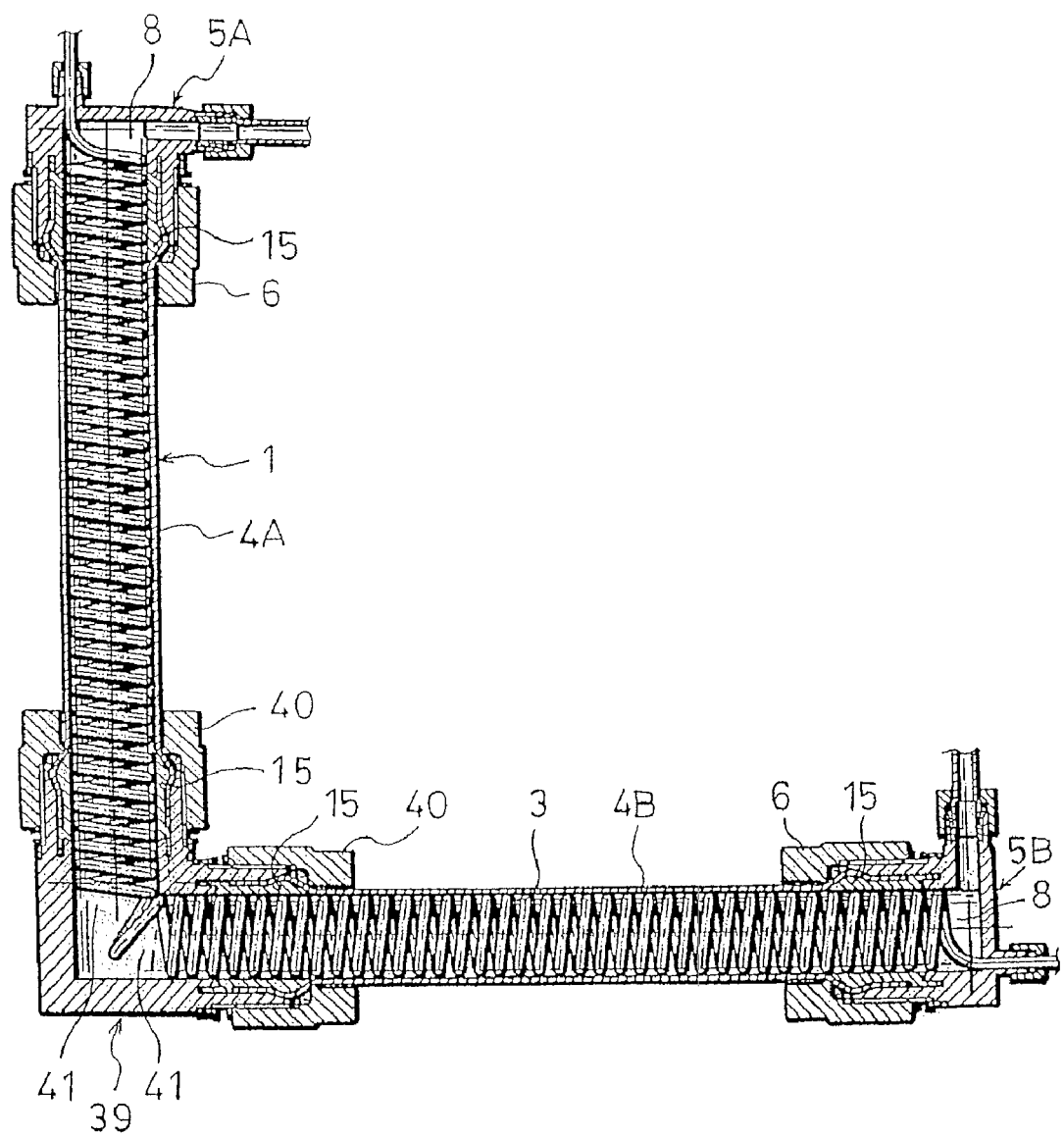
FIG. 13 is a section view showing another example of a casing of the tube device of the embodiment of the invention.
Figure 14:
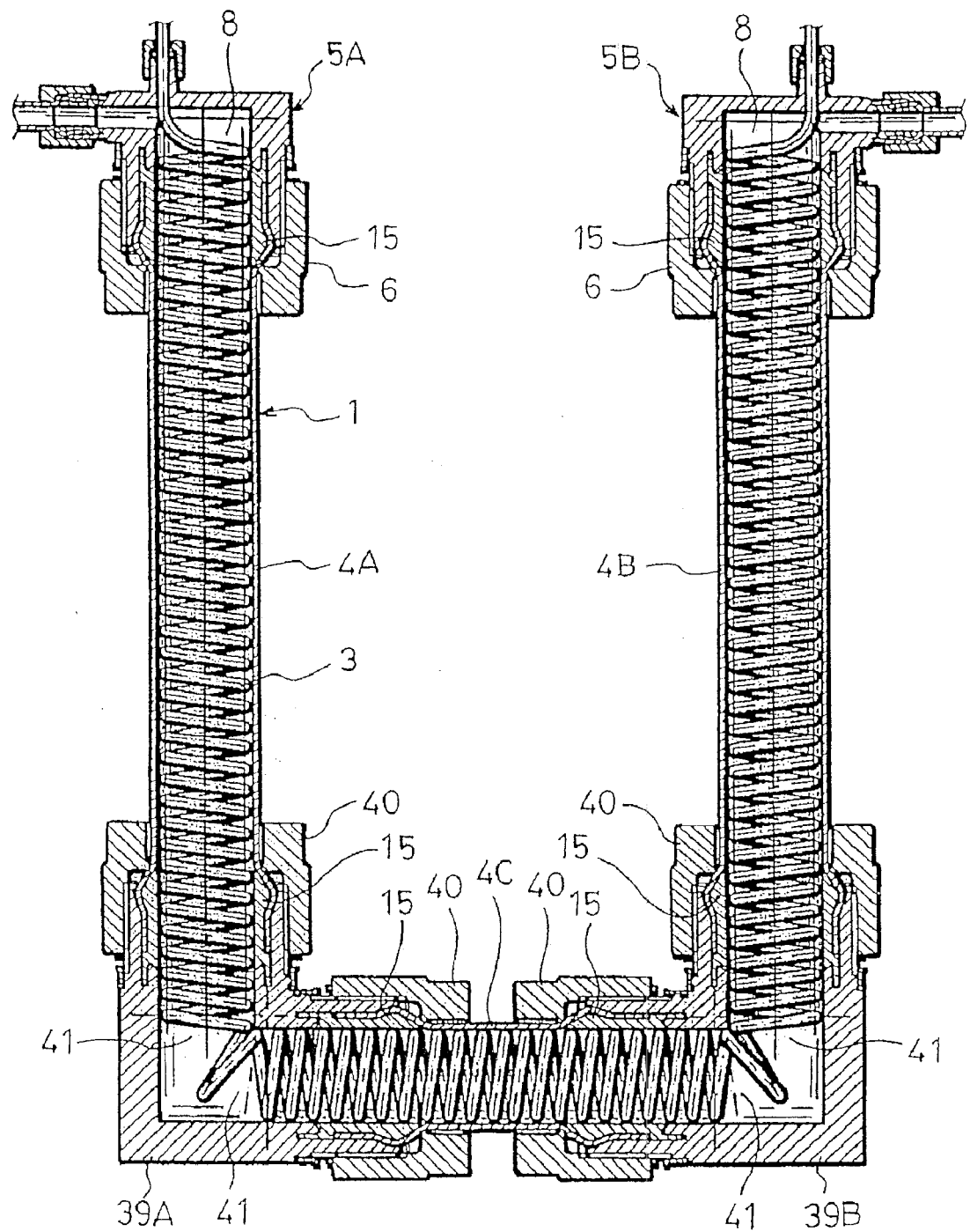
FIG. 14 is a section view showing a further example of the casing of the tube device of the embodiment of the invention.

The overall shape of the casing 1 of the tube device can be formed into various shapes including an L-shape shown in FIG. 13, and a U-shape shown in FIG. 14 in place of the linear pipelike shape in the embodiments described above. In an L-shaped casing 1 shown in FIG. 13, two or first and second tubes 4A, 4B, two or first and second lid members 5A, 5B, and one elbow joint member 39 made of a synthetic resin such as a fluororesin are used. In a U-shaped casing 1 shown in FIG. 14, three or first, second, and third tubes 4A, 4B, 4C, two or first and second lid members 5A, 5B, and two or first and second elbow joint members 39A, 39B made of a synthetic resin such as a fluororesin are used.

In the L-shaped casing 1 shown in FIG. 13, the first and second lid members 5A, 5B are connected to end portions on one side of the first and second tubes 4A, 4B by first union nuts 6, respectively, and the other ends of the first and second tubes 4A, 4B are connected to each other by the single elbow joint member 39 and a pair of second union nuts 40. In this case, the structure for connecting the first and second lid members 5A, 5B to the end portions of the first and second tubes 4A, 4B is configured in the same manner as that for connecting the end portions of the tube 4 to the lid members 5 in the embodiments described above.

In the joint member 39, connecting ports 41 are opened in the ends so as to perpendicularly communicate with each other, and the internal structures of the connecting ports 41 are identical with those of the receiving portions 8 of the lid members 5. Namely, first to third sealing faces are disposed inside each of the connecting ports 41 of the joint member 39. The first sealing face is configured by a tapered face which is formed inner than the entrance of the connecting port 41, and in which the diameter is gradually increased toward the outer side in the axial direction. The second sealing face is configured by a tapered face in which the diameter is gradually increased toward the outer side in the axial direction. The third sealing face is configured by an annular groove which is formed in an inner portion of the connecting port 41 and in the radially outer side with respect to the first sealing face, and which elongates parallel to the axis. By contrast, inner rings 15 having the same section shape as inner rings 15 in the end portions of the first and second tubes 4A, 4B are pressingly inserted into the other end portions of the first and second tubes 4A, 4B. Therefore, the other end portion of the first tube 4A is connected to the connecting port 41 in the one end of the joint member 39, and that of the second tube 4B is connected to the connecting port 41 in the other end. These connections are conducted by connecting structures which are identical with those for connecting the end portions of the first and second tubes 4A, 4B to the receiving portions 8 of the first and second lid members 5A, 5B. A fluid tube 3 is perpendicularly bent inside the joint member 39.

In the U-shaped casing 1 shown in FIG. 14, the first and second lid members 5A, 5B are connected to end portions on one side of the first and second tubes 4A, 4B by first union nuts 6, and the third tube 4C is connected between the other end portions of the first and second tubes 4A, 4B by the two elbow joint members 39 and a pair of second union nuts 40. In this case also, the structure for connecting the receiving portions 8 of the first and second lid members 5A, 5B to the end portions of the first and second tubes 4A, 4B is configured in the same manner as that for connecting the end portions of the tube 4 to the lid members 5 in the embodiments described above. The structure for connecting the connecting ports 41 of the joint members 39 to the other ends of the first and second tubes 4A, 4B, and that for connecting the connecting ports 41 of the joint members 39 to the both ends of the third tube 4C are identical with that for connecting the end portions of the first and second tubes 4A, 4B to the receiving portions 8 of the first and second lid members 5A, 5B. The fluid tube 3 is perpendicularly bent inside the joint members 39.

Alternatively, the casing 1 may be formed into a shape in which the L-shaped casing 1 of FIG. 13 is combined with the U-shaped casing 1 of FIG. 14.

When the casing 1 of the tube device is formed into an L-shape, a U-shape, or the like as described above, it is possible to build a compact piping system in which a dead space of pipes is effectively used. The device can be advantageously formed into a shape which can satisfy a request for modifying a piping system, such as that for newly installing a tube device in an existing piping system.

Other Embodiments of the Sealing Portion

Figure 15:
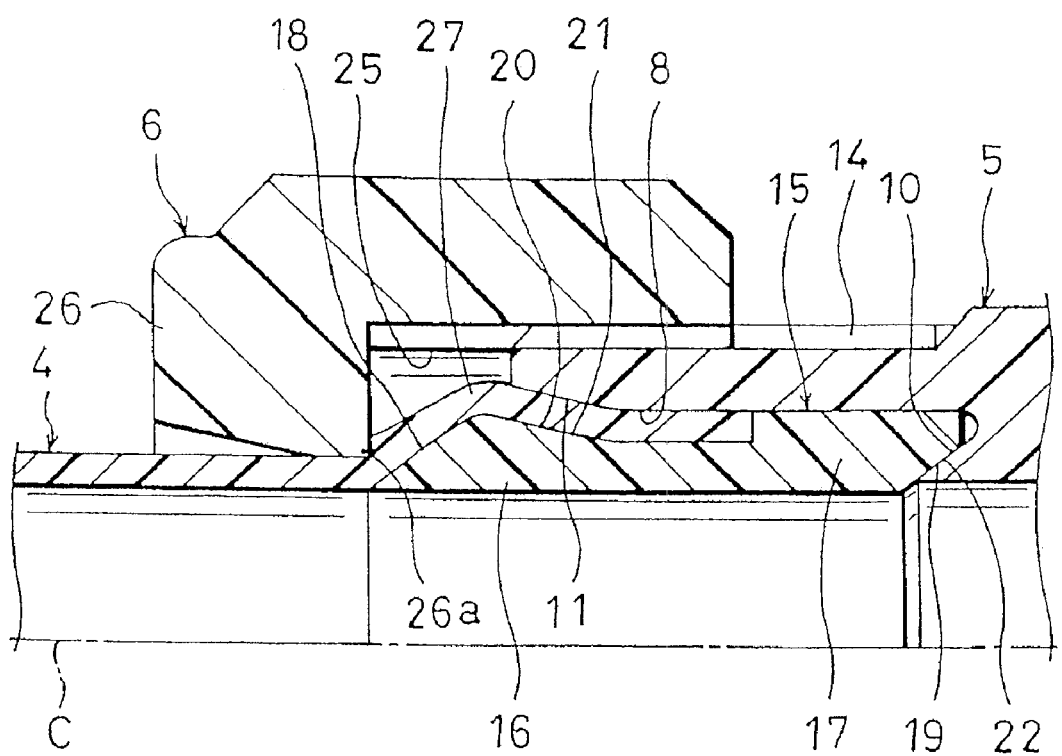
FIG. 15 is a section view showing another example of a sealing portion of the tube device of the embodiment of the invention.

In each of the sealing portions formed between the end portions of the tube 4 and the receiving portions 8 of the lid members 5, as in the embodiment shown in FIG. 3, the sealing property can be improved more surely by, in addition to the first and second sealing portions 19, 21, further providing the third sealing portion 23 due to the cylindrical portion 24 of the inner ring 15 and the annular groove 13 of the lid member 5. The structure of the sealing portion is not restricted to this. As shown in FIG. 15, for example, a structure may be employed in which only the first and second sealing portions 19, 21 are formed, and the third sealing portion 23 is omitted. In the structure, specifically, the annular groove 13 is not formed in an inner portion of the lid member 5, and the cylindrical portion 24 is not disposed in the inner ring 15. In this case, the first sealing face 10 disposed in an inner portion of the lid member 5 is configured by a tapered face in which the diameter is gradually reduced so as to intersect with the axis C in a direction opposite to that of the second sealing face 11, or toward the outer side in the direction of the axis C.

Figure 16:
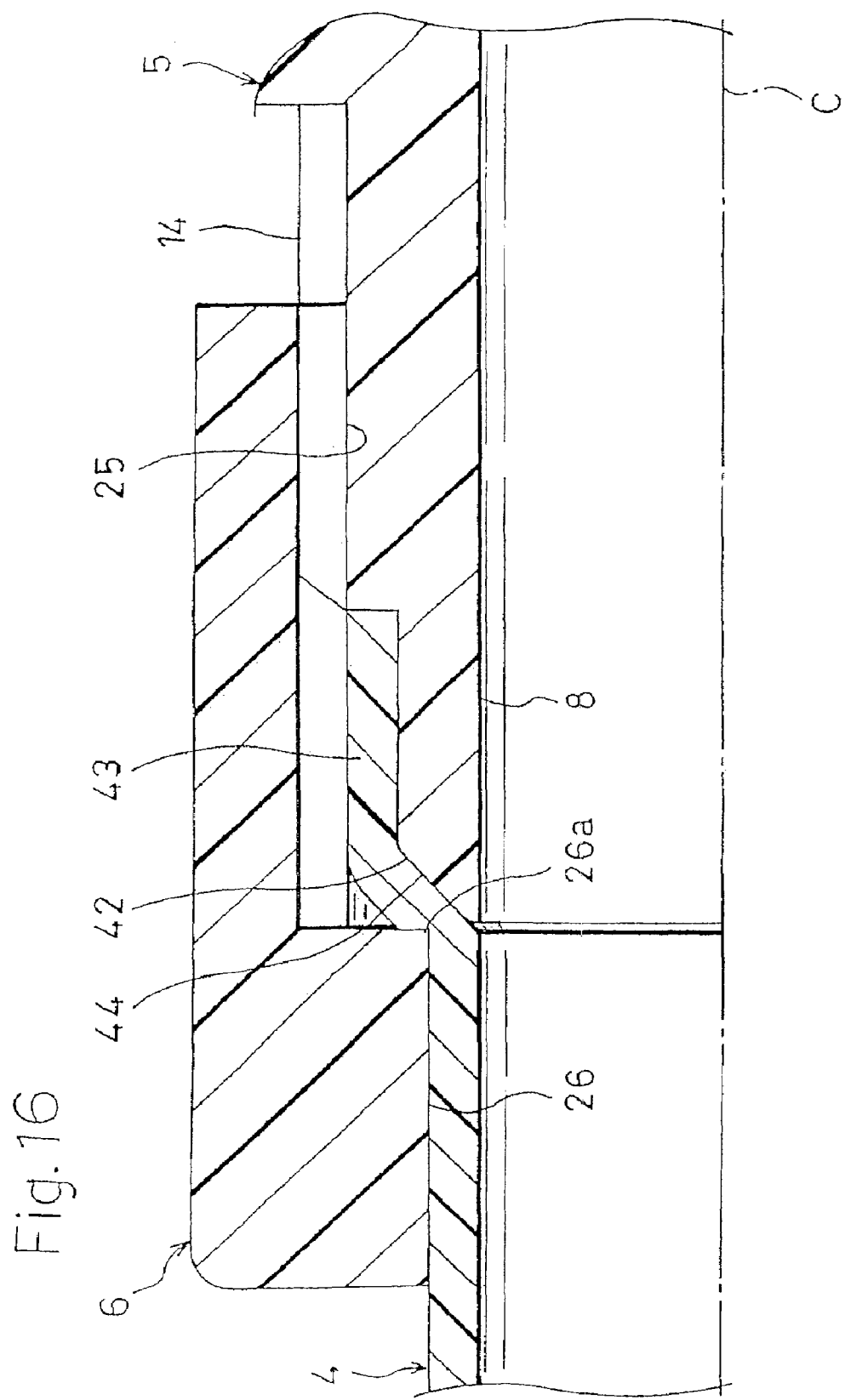
FIG. 16 is a section view showing a further example of the sealing portion of the tube device of the embodiment of the invention.

Alternatively, as shown in FIG. 16, a sealing face 42 formed by a tapered face in which the diameter is larger than the inner diameter of the tube 4 is formed on the outer periphery of the end portion on the tip end side of the receiving portion 8 of the lid member 5, and an external thread portion 14 in which the diameter is larger than the outer diameter of the sealing face 42 is formed in the outer periphery in rear of the sealing face 42. A flaring process is applied to the end portion of the tube 4 to form a large diameter portion 43. The large diameter portion 43 in the end portion of the tube 4 is pressingly fitted onto the sealing face 42 of the lid member 5. The union nut 6 fitted onto the tube 4 is then screwed and fastened to the external thread portion 14 of the lid member 5, so that the pressing edge 26a of the annular flange 26 of the union nut 6 butts against the outer side of the tube 4 to axially press the inner peripheral face of the large diameter portion 43 against the sealing face 42 of the receiving portion 8 to be closely contacted therewith, whereby a sealing portion 44 is formed.

Figure 17:
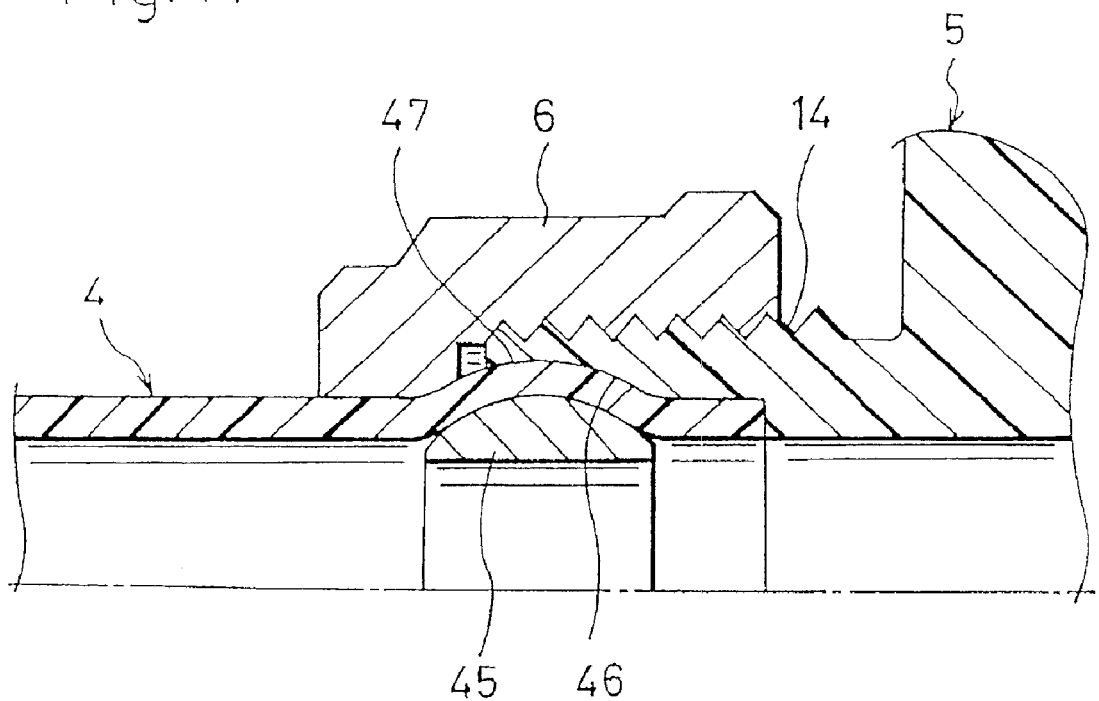
FIG. 17 is a section view showing a still further example of the sealing portion of the tube device of the embodiment of the invention.

Alternatively, a sealing structure may be configured as shown in FIG. 17. An inner ring 45 which is made of made of a synthetic resin such as a fluororesin, and which has an arcuate section shape is pressingly inserted into the end portion of the tube 4 to increase the diameter of the end portion, thereby expanding the end portion so as to have a mountain-like section shape. A union nut 6 screwed to an external thread portion 14 of the lid member 5 is screwingly advanced to firmly fasten the end portion. As a result, the end portion of the tube 4 is pressed together with the inner ring 45 against a tapered sealing face 46 disposed on the inner periphery of the receiving portion 8 of the lid member 5, to be closely contacted therewith, thereby forming a sealing portion 47.

Figure 18:
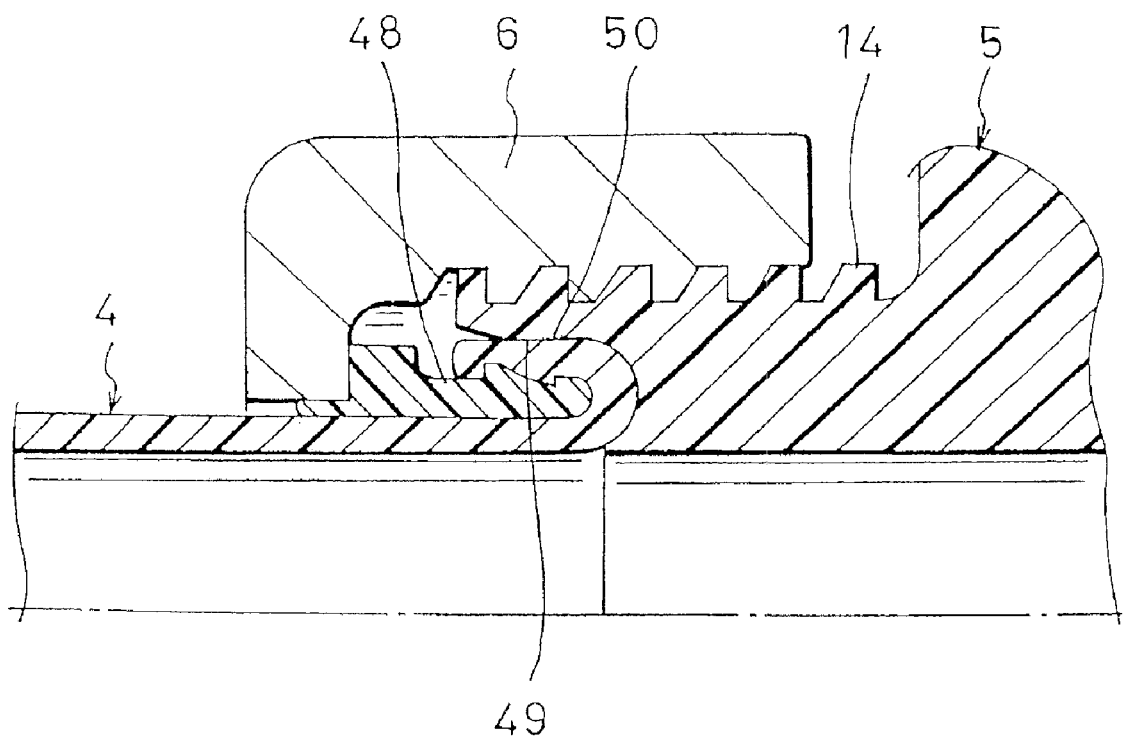
FIG. 18 is a section view showing a still further example of the sealing portion of the tube device of the embodiment of the invention.
Figure 19:
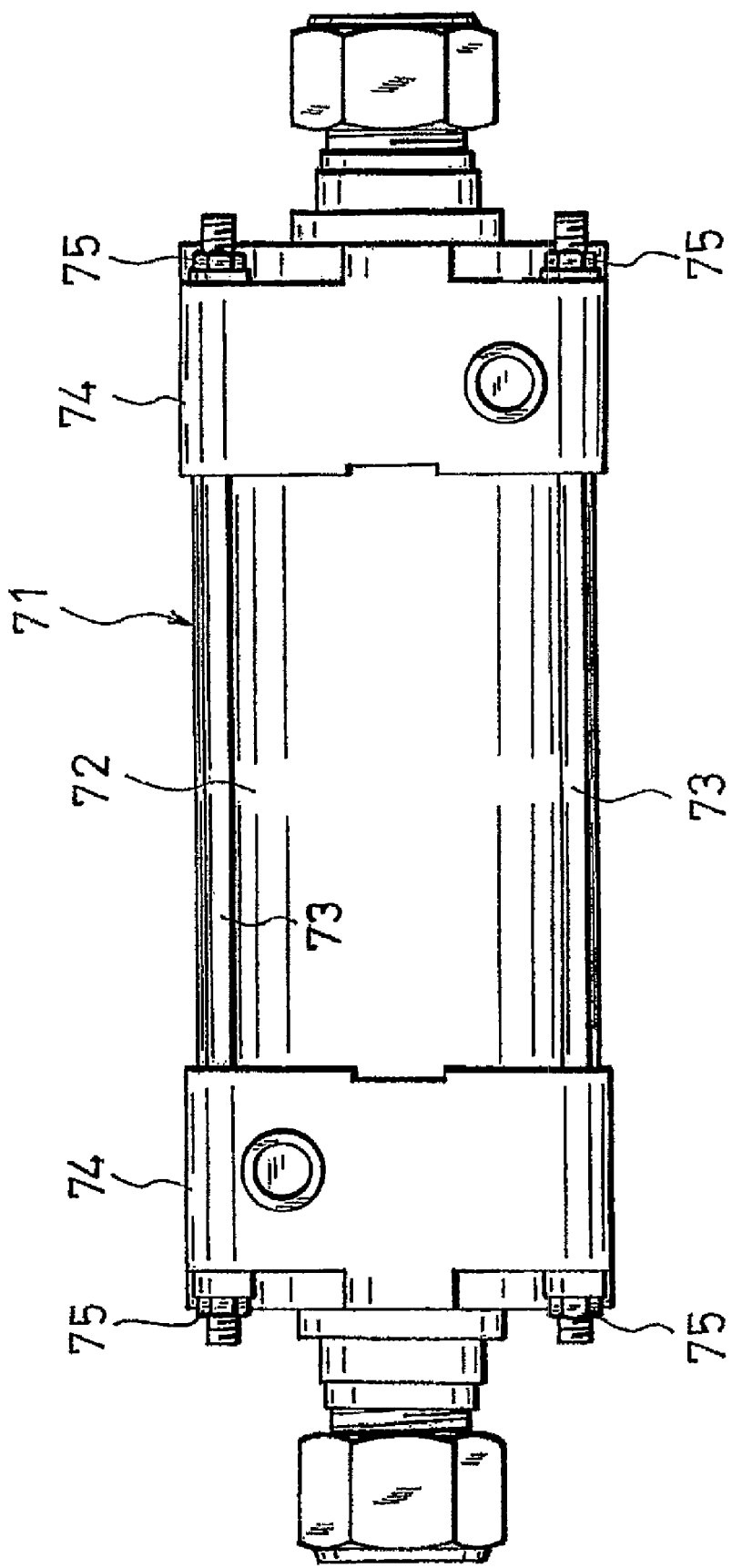
FIG. 19 is a front view of a tube device (heat exchanger) of a conventional art example.

Alternatively, a sealing structure may be configured as shown in FIG. 18. An outer ring 48 is fitted onto the end portion of the tube 4. The terminal portion of the tube 4 is folded back onto the outer face of the outer ring 48. A union nut 6 screwed to an external thread portion 14 of the lid member 5 is screwingly advanced to firmly fasten the terminal portion. As a result, the end portion of the tube 4 is pressed together with the outer ring 48 against a tapered sealing face 49 in the receiving portion 8 of the lid member 5, to be closely contacted therewith, thereby forming a sealing portion 50.

It is a matter of course that the invention can be similarly applied also to various piping systems other than a chemical supply piping system in an apparatus for producing semiconductor devices.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A tube device including a casing, and a device element which is placed in said casing, wherein said casing comprises:
a tube made of a synthetic resin;
a pair of lid members which are made of a synthetic resin;
a pair of union nuts which are made of a synthetic resin, which are fitted onto one and other end portions of said tube, and which are screwed to end portions of said lid members having receiving ports, respectively; and
a sealing portion which is formed in at least one place for each of said end portions of said tube by closely contacting said end portion of said tube with a sealing face of a corresponding one of said lid members, said end portion of said tube and said sealing face of said lid member being closely contacted with each other by causing a corresponding one of said union nuts to press said tube from an outside of said tube, said corresponding one of said union nuts fastening said end portion of said lid member by screw advancement toward said end portion of said lid member, thereby pressing said tube from the outside of said tube,
wherein said device element is a heat exchange tube which is made of a synthetic resin, and in which an outer periphery is surrounded by said tube made of synthetic resin and connecting portions which are disposed on said pair of lid members made of a synthetic resin, and to which outlet ports of said heat exchange tube, and pipes for introducing and discharging a fluid that is passed between an inner side of said casing and an outer side of said heat exchange tube are connected, respectively,
wherein an inner ring is formed in each of said end portions of said tube, said inner ring having: a press-insertion portion which is pressingly inserted into said end portion of said tube to increase a diameter of said end portion, thereby expanding said end portion so as to have a protruding shape; and a projection portion which projects from said end portion of said tube, and
wherein said sealing portion is formed by close contact between: a sealing face configured as a tapered face which is formed inward of an entrance of a receiving portion of said lid member, and in which a diameter is gradually increased toward an outer side in an axial direction of said lid member; and a projection end face formed by a tapered face which is formed in a tip end of said projection portion of said inner ring.

2. A tube device including a casing, and a device element which is placed in said casing, wherein said casing comprises:
a tube made of a synthetic resin;
a pair of lid members which are made of a synthetic resin;
a pair of union nuts which are made of a synthetic resin, which are fitted onto one and other end portions of said tube, and which are screwed to end portions of said lid members having receiving ports, respectively; and
a sealing portion which is formed in at least one place for each of said end portions of said tube by closely contacting said end portion of said tube with a sealing face of a corresponding one of said lid members, said end portion of said tube and said sealing face of said lid member being closely contacted with each other by causing a corresponding one of said union nuts to press said tube from an outside of said tube, said corresponding one of said union nuts fastening said end portion of said lid member by screw advancement toward said end portion of said lid member, thereby pressing said tube from the outside of said tube,
wherein said device element is a heat exchange tube which is made of a synthetic resin, and in which an outer periphery is surrounded by said tube made of synthetic resin and connecting portions which are disposed on said pair of lid members made of a synthetic resin, and to which outlet ports of said heat exchange tube, and pipes for introducing and discharging a fluid that is passed between an inner side of said casing and an outer side of said heat exchange tube are connected, respectively,
wherein an inner ring is formed in each of said end portions of said tube, said inner ring having: a press-insertion portion which is pressingly inserted into said end portion of said tube to increase a diameter of said end portion, thereby expanding said end portion so as to have a protruding shape; and a projection portion which projects from said end portion of said tube, and
wherein said sealing portion is formed by pressingly holding said end portion of said tube in an inclined state between: a sealing face which is formed in an entrance of a receiving portion of said lid member by a tapered face intersecting with an axis of said lid member, and an inward tapered face which is formed on an inclined face of said press-insertion portion of said inner ring.

3. A tube device including a casing, and a device element which is placed in said casing, wherein said casing comprises:
a tube made of a synthetic resin;
a pair of lid members which are made of a synthetic resin;
a pair of union nuts which are made of a synthetic resin, which are fitted onto one and other end portions of said tube, and which are screwed to end portions of said lid members having receiving ports, respectively; and
a sealing portion which is formed in at least one place for each of said end portions of said tube by closely contacting said end portion of said tube with a sealing face of a corresponding one of said lid members, said end portion of said tube and said sealing face of said lid member being closely contacted with each other by causing a corresponding one of said union nuts to press said tube from an outside of said tube, said corresponding one of said union nuts fastening said end portion of said lid member by screw advancement toward said end portion of said lid member, thereby pressing said tube from the outside of said tube,
wherein said device element is a heat exchange tube which is made of a synthetic resin, and in which an outer periphery is surrounded by said tube made of synthetic resin and connecting portions which are disposed on said pair of lid members made of a synthetic resin, and to which outlet ports of said heat exchange tube, and pipes for introducing and discharging a fluid that is passed between an inner side of said casing and an outer side of said, heat exchange tube are connected, respectively,
wherein an inner ring is formed in each of said end portions of said tube, said inner ring having: a press-insertion portion which is pressingly inserted into said end portion of said tube to increase a diameter of said end portion, thereby expanding said end portion so as to have a protruding shape; and a projection portion which projects from said end portion of said tube, and
wherein said tube device comprises a plurality of said sealing portions for each of said end portions of said tube, said sealing portions being:
a sealing portion formed by close contact between: a sealing face configured as by a tapered face which is formed inward of an entrance of a receiving portion of said lid member, and in which a diameter is gradually increased toward an outer side in an axial direction of said lid member; and a projection end face formed by a tapered face which is formed in a tip end of said projection end portion of said inner ring; and a sealing portion formed by pressingly holding said end portion of said tube in an inclined state between: a sealing face which is formed in an entrance of said receiving portion of said lid member by a tapered face intersecting with an axis of said lid member; and an inward tapered face which is formed on an inclined face of said press-insertion portion of said inner ring.

4. A tube device including a casing, and a device element which is placed in said casing, wherein said casing comprises:

a tube made of a synthetic resin;

a pair of lid members which are made of a synthetic resin;

a pair of union nuts which are made of a synthetic resin, which are fitted onto one and other end portions of said tube, and which are screwed to end portions of said lid members having receiving ports, respectively; and a sealing portion which is formed in at least one place for each of said end portions of said tube by closely contacting said end portion of said tube with a sealing face of a corresponding one of said lid members, said end portion of said tube and said sealing face of said lid member being closely contacted with each other by causing a corresponding one of said union nuts to press said tube from an outside of said tube, said corresponding one of said union nuts fastening said end portion of said lid member by screw advancement toward said end portion of said lid member, thereby pressing said tube from the outside of said tube, wherein said device element is a heat exchange tube which is made of a synthetic resin, and in which an outer periphery is surrounded by said tube made of synthetic resin and connecting portions which are disposed on said pair of lid members made of a synthetic resin, and to which outlet ports of said heat exchange tube, and pipes for introducing and discharging a fluid that is passed between an inner side of said casing and an outer side of said heat exchange tube are connected, respectively, wherein an inner ring is formed in each of said end portions of said tube, said inner ring having: a press-insertion portion which is pressingly inserted into said end portion of said tube to increase a diameter of said end portion, thereby expanding said end portion so as to have a protruding shape; and a projection portion which projects from said end portion of said tube, and wherein said tube device comprises a plurality of said sealing portions for each of said end portions of said tube, said sealing portions being:

a sealing portion formed by close contact between: a sealing face configured as a tapered face which is formed inward of an entrance of a receiving portion of said lid member, and in which a diameter is gradually increased toward an outer side in an axial direction of said lid member; and a projection end face formed by a tapered face which is formed in a tip end of said projection portion of said inner ring; and wherein another sealing portion is formed by fitting a cylindrical portion which is formed in a tip end of said projection portion of said inner ring, into an annular groove which is formed in a radial outer side with respect to said sealing face that is formed in an inner portion of said receiving portion of said lid member, said annular groove being elongated parallel to an axis of said lid member.

5. A tube device including a casing, and a device element which is placed in said casing, wherein said casing comprises:

a tube made of a synthetic resin;

a pair of lid members which are made of a synthetic resin;

a pair of union nuts which are made of a synthetic resin, which are fitted onto one and other end portions of said tube, and which are screwed to end portions of said lid members having receiving ports, respectively; and a sealing portion which is formed in at least one place for each of said end portions of said tube by closely contacting said end portion of said tube with a sealing face of a corresponding one of said lid members, said end portion of said tube and said sealing face of said lid member being closely contacted with each other by causing a corresponding one of said union nuts to press said tube from an outside of said tube, said corresponding one of said union nuts fastening said end portion of said lid member by screw advancement toward said end portion of said lid member, thereby pressing said tube from the outside of said tube, wherein said device element is a heat exchange tube which is made of a synthetic resin, and in which an outer periphery is surrounded by said tube made of synthetic resin and connecting portions which are disposed on said pair of lid members made of a synthetic resin, and to which outlet ports of said heat exchange tube, and pipes for introducing and discharging a fluid that is passed between an inner side of said casing and an outer side of said heat exchange tube are connected, respectively, wherein an inner ring is formed in each of said end portions of said tube, said inner ring having: a press-insertion portion which is pressingly inserted into said end portion of said tube to increase a diameter of said end portion, thereby expanding said end portion so as to have a protruding shape; and said inner ring further having a projection portion which projects from said end portion of said tube, and wherein said tube device comprises a plurality of said sealing portions for each of said end portions of said tube, said sealing portions comprising:

a sealing portion formed by pressingly holding said end portion of said tube in an inclined state between: a sealing face which is formed in an entrance of a receiving portion of said lid member by a tapered face intersecting with an axis of said lid member; and an inward tapered face which is formed on an inclined face of said press-insertion portion of said inner ring; and wherein another sealing portion is formed by fitting a cylindrical portion which is formed in a tip end of said projection portion of said inner ring, into an annular groove which is formed in a radial outer side with respect to said sealing face that is formed in an inner portion of said receiving portion of said lid member, said annular groove being elongated parallel to an axis of said lid member.

* * * * *